United States Patent
Youn et al.

(10) Patent No.: US 11,413,740 B2
(45) Date of Patent: *Aug. 16, 2022

(54) ROBOT

(71) Applicant: LG ELECTRONICS INC., Seoul (KR)

(72) Inventors: Jekwang Youn, Seoul (KR); Yongbeom Ma, Seoul (KR); Changil Shin, Seoul (KR); Younghwan Lee, Seoul (KR); Daeyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 504 days.

This patent is subject to a terminal disclaimer.

(21) Appl. No.: 16/589,591

(22) Filed: Oct. 1, 2019

(65) Prior Publication Data

US 2020/0030963 A1 Jan. 30, 2020

(30) Foreign Application Priority Data

Mar. 8, 2019 (WO) ................ PCT/KR2019/002730

(51) Int. Cl.
*B25J 9/00* (2006.01)
*B62D 63/04* (2006.01)

(52) U.S. Cl.
CPC ............. *B25J 9/0009* (2013.01); *B62D 63/04* (2013.01)

(58) Field of Classification Search
CPC ... B25J 11/0005; B25J 11/0015; B25J 11/003; B25J 9/1689; B25J 9/1697; B25J 9/0009;
(Continued)

(56) References Cited

U.S. PATENT DOCUMENTS 7,103,449 B2 * 9/2006 Woo ..................... G05D 1/0225
    701/1
8,781,164 B2 * 7/2014 Lee ..................... G05D 1/0246
    701/28
(Continued)

FOREIGN PATENT DOCUMENTS

CN     206764796     12/2017
CN     108488562     9/2018
(Continued)

OTHER PUBLICATIONS

International Search Report dated Dec. 6, 2019 issued in International Application No. PCT/KR2019/002730.

*Primary Examiner* — Jake Cook
*Assistant Examiner* — T. Scott Fix
(74) *Attorney, Agent, or Firm* — KED & Associates, LLP

(57) ABSTRACT

A robot includes a casing having an internal space, a head that protrudes from the casing and having a first display, a second display provided on a front of the casing, a first motor embedded in the casing, a lifting plate configured to ascend and descend via power of the first motor, a first bar having a first end connected to the head and a second end in contact with the lifting plate, a fixed plate positioned between the lifting plate and the head, and having an opening defined therein through which the first bar passes, a linkage that connects the lifting plate and the fixed plate to the second display, a first guide body rotatably disposed above the fixed plate and guiding movement of the first bar, and a second motor rotating the first guide body.

20 Claims, 25 Drawing Sheets

(58) Field of Classification Search
CPC ......... B25J 5/005; B25J 5/007; Y10S 901/01; Y10S 901/08; G05D 2201/0211; G05D 2201/0206; G05D 2201/0207; A63H 3/00; A63H 3/001; A63H 3/04; A63H 3/20; A63H 3/365; A63H 13/00; A63H 13/005
USPC ...................................................... 74/490.05
See application file for complete search history.

(56) References Cited

U.S. PATENT DOCUMENTS

| | | | |
|---|---|---|---|
| 2008/0029536 A1* | 2/2008 | Wang ..................... | B25J 19/022 221/210 |
| 2011/0288684 A1* | 11/2011 | Farlow ................. | G05D 1/0038 901/1 |
| 2012/0061155 A1* | 3/2012 | Berger ................. | B25J 19/0016 180/21 |
| 2012/0209433 A1* | 8/2012 | Paz Rodriguez .... | B25J 11/0005 901/1 |

FOREIGN PATENT DOCUMENTS

| | | |
|---|---|---|
| JP | 2016-101441 | 6/2016 |
| KR | 10-2011-0053724 | 5/2011 |
| KR | 10-2019-0003121 | 1/2019 |

\* cited by examiner

This application claims priority under 35 U.S.C. § 119 to Korean Application No. PCT/KR2019/002730 filed on Mar. 8, 2019, whose entire disclosure is hereby incorporated by reference.

BACKGROUND

1. Field

The present disclosure relates to a robot, and more particularly, to a robot having a head.

2. Background

Robots have been developed for industrial use in order to assist in factory automation. In recent years, applications of the robot have been expanded such that robots that may be used in daily life as well as medical robots and aerospace robots have been developed.

These robots may provide specific services (e.g., shopping, serving, conversation, cleaning, etc.) in response to a user command. In addition, the robots may include a display to display information, videos, or images related to the services.

In addition, specific robots may include a head and a body to resemble a human body to give a user an affinity. In this case, the head may be provided with a head display for indicating a facial expression and the like of the robot. Further, the body may be provided with a body display for displaying the information, videos, or images related to the service. However, the conventional robots have a problem that only the head display is rotated or tilted, and the body display is fixed and does not move.

BRIEF DESCRIPTION OF THE DRAWINGS

Embodiments will be described in detail with reference to the following drawings in which like reference numerals refer to like elements, and wherein.

DETAILED DESCRIPTION

Figure 1:
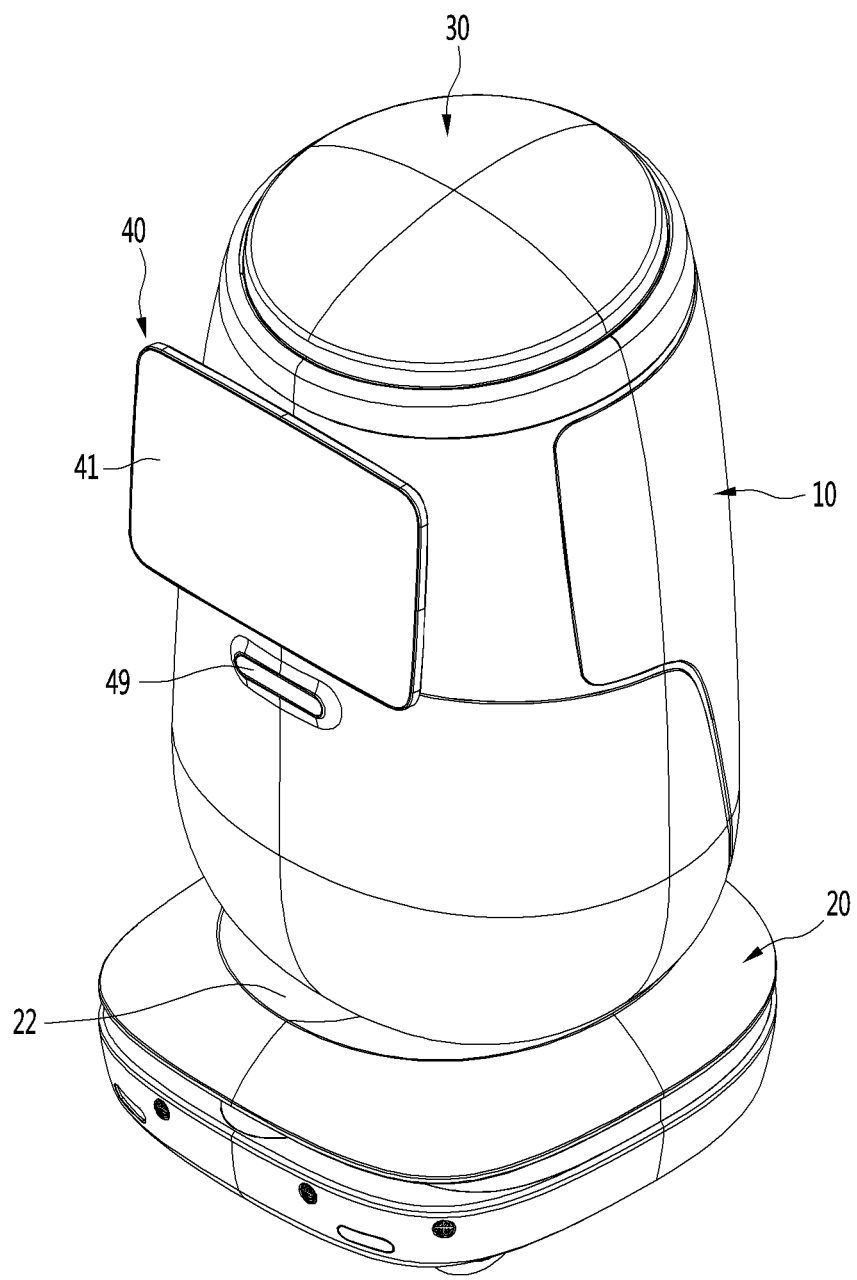
FIG. 1 is a perspective view of a robot according to an embodiment of the present disclosure.
Figure 2:
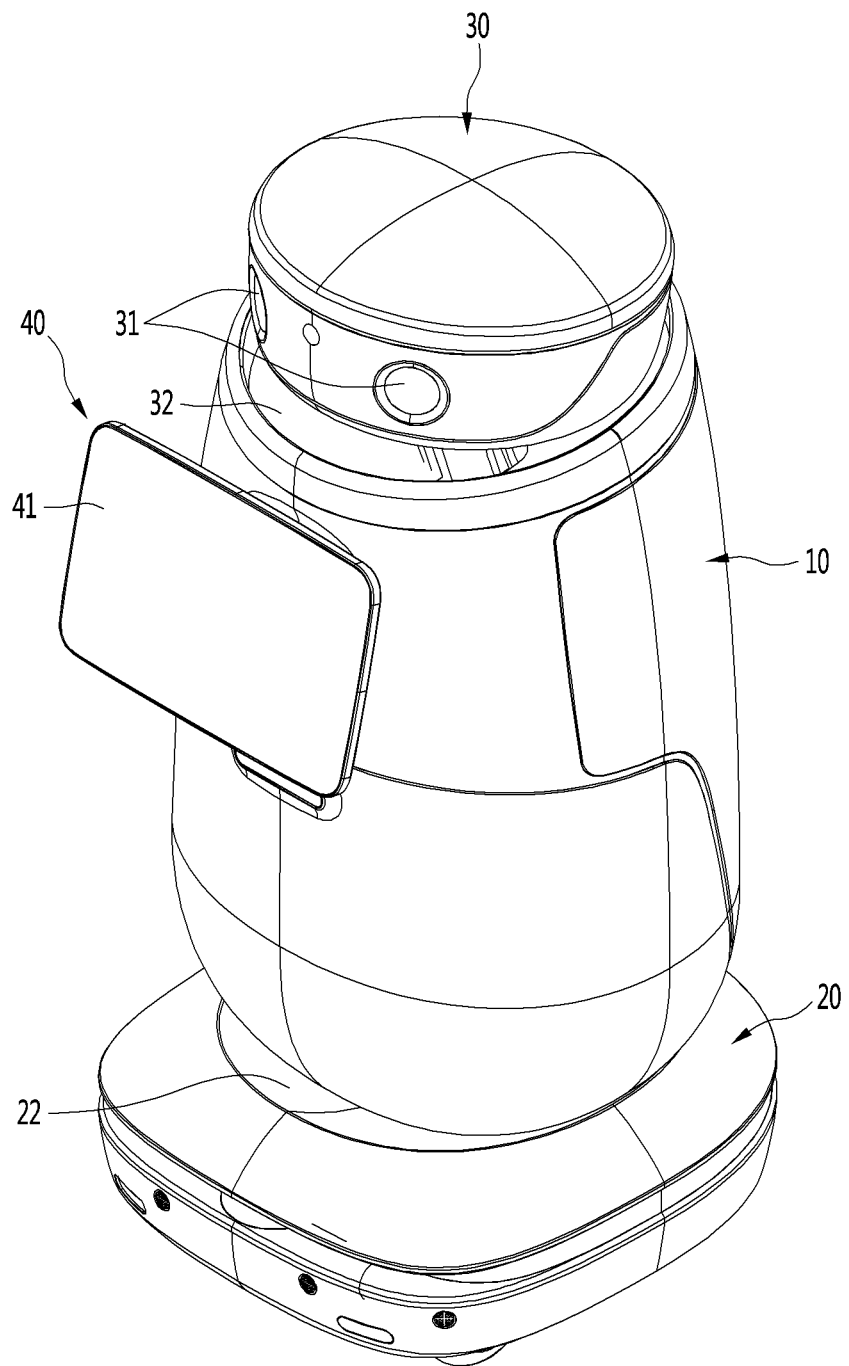
FIG. 2 illustrates a head unit and a display unit of the robot illustrated in FIG. 1 in a state of being tilted upward.

Referring to FIGS. 1 and 2, a robot according to an embodiment of the present disclosure may include a casing 10, a head unit (or head) 30, and a display unit (or display) 40. The casing 10 may form an outer surface of the robot. The casing 10 may have a substantially hollow cylindrical shape. The casing 10 may have a streamlined body.

The casing 10 may have an internal space defined therein. A top of the casing 10 may be opened. A sensor device (or sensor) 49 may be provided on a front face of the casing 10. The sensor device 49 may include at least one of a depth camera and a ridar.

The head 30 may protrude upward from the casing 10. The head 30 may include a first display 31. The first display 31 may be referred to as a head display. The first display 31 may be directed forward.

The head 30 may be vertically tiltable. More specifically, the head 30 may be tilted upward while being ascended, or tilted downward while being descended. When the head 30 is tilted downward, at least a portion of the head 30 may be received into the casing 10. Further, the first display 31 may be hidden in the casing 10.

When the head 30 is tilted upward, at least a portion of the head 30 may protrude upwardly from the casing 10. Further, the first display 31 may protrude upwardly from the casing 10. When the head 30 is tilted upward, a facing direction of the first display 31 may be tilted upward. When the head 30 is tilted downward, a facing direction of the first display 31 may be tilted downward.

The display 40 may be disposed in front of the casing 10. The display 40 may include a second display 41. The second display 41 may be referred to as a main display. The second display 41 may be directed forward.

The display 40 may be vertically tiltable. More specifically, the display 40 may be tilted upward while moving forward, or may be tilted downward while moving backward.

When the display 40 is tilted downward, a rear face of the display unit may be in contact with or adjacent to the casing 10. When the display 40 is tilted upward, the rear face of the display 40 may be spaced apart from the casing 10.

When the display 40 is tilted upward, a facing direction of the second display 41 may be tilted upward. When the display 40 is tilted downward, the facing direction of the second display 41 may be tilted downward.

The robot according to an embodiment of the present disclosure may include a head receiving cover 32. The head receiving cover 32 may cover the open top of the casing 10. The head receiving cover 32 may be disposed on a bottom face of the head 30.

The head receiving cover 32 may be depressed downwardly. At least a portion of the head 30 may be received in the head receiving cover 32. The head receiving cover 32 may prevent foreign matter or the like from entering the casing 10 through a space between the casing 10 and the head 30 when the head 30 is tilted upward.

In this connection, the robot according to an embodiment of the present disclosure may include a base 20. The base 20 may be provided on a bottom face of the casing 10. A size of the base 20 in a horizontal direction may be greater than a size of the casing 10 in a horizontal direction. A height of the base 20 may be smaller than a height of the casing.

Figure 6:
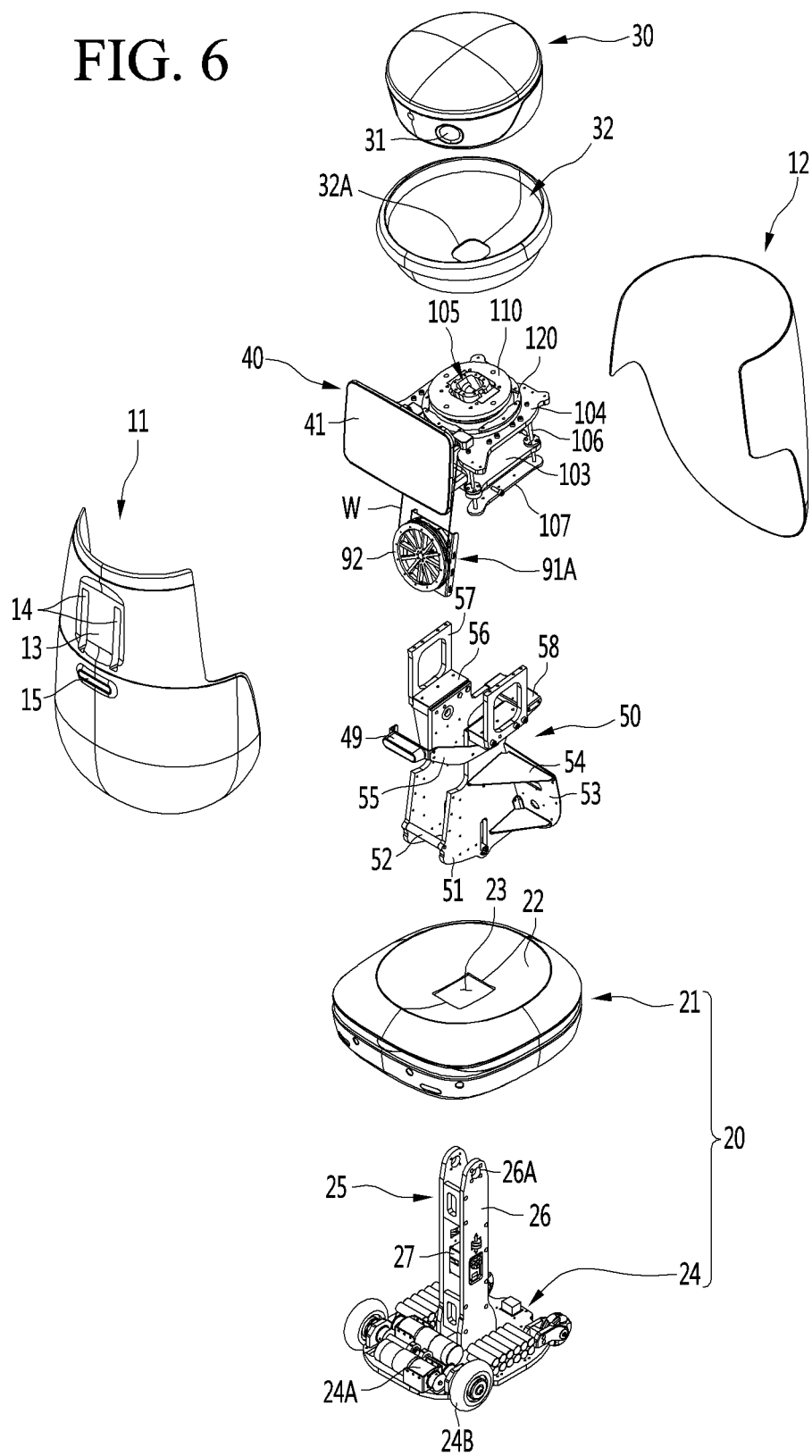
FIG. 6 is an exploded perspective view of a robot according to an embodiment of the present disclosure.
Figure 7:
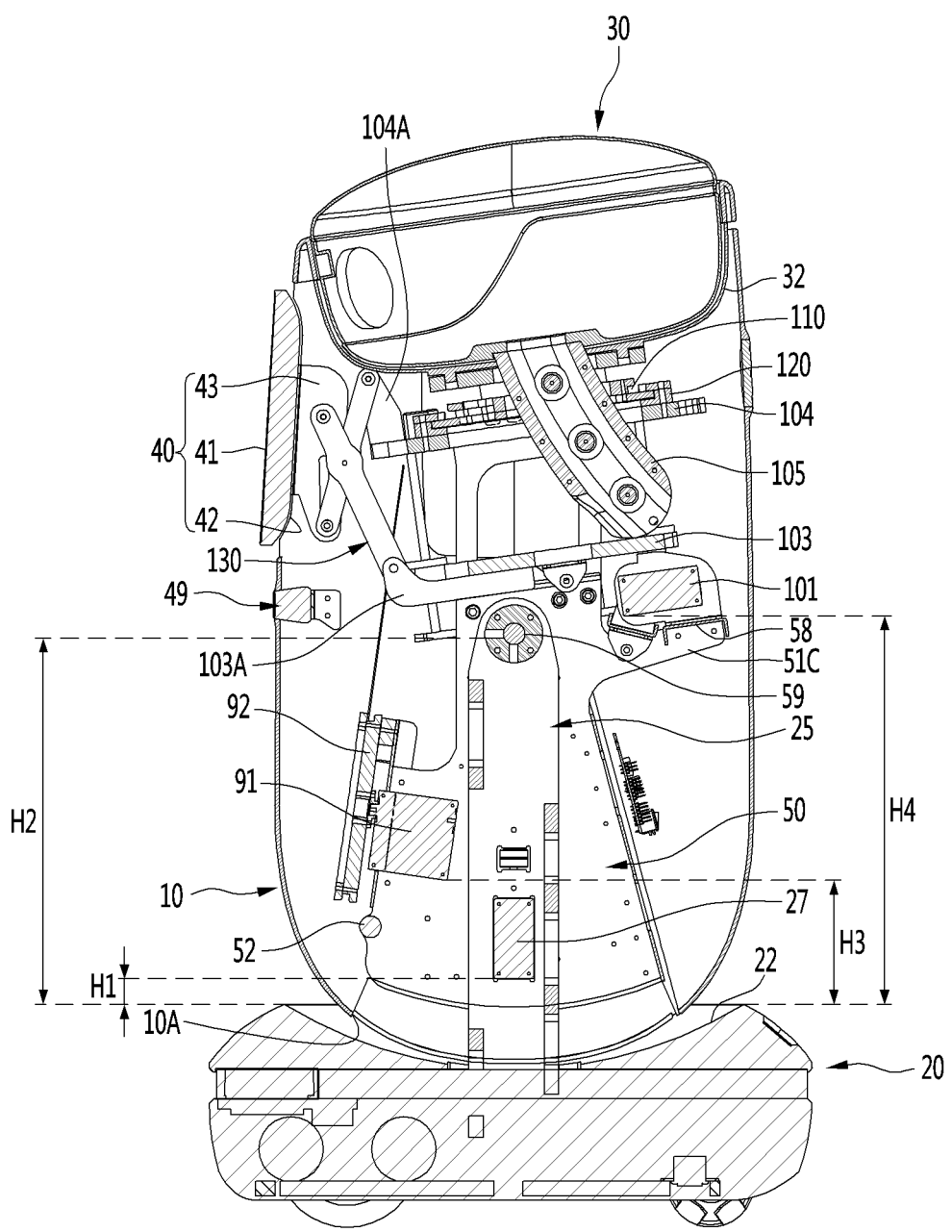
FIG. 7 is a cross-sectional view of interior of a robot according to an embodiment of the present disclosure.
Figure 8:
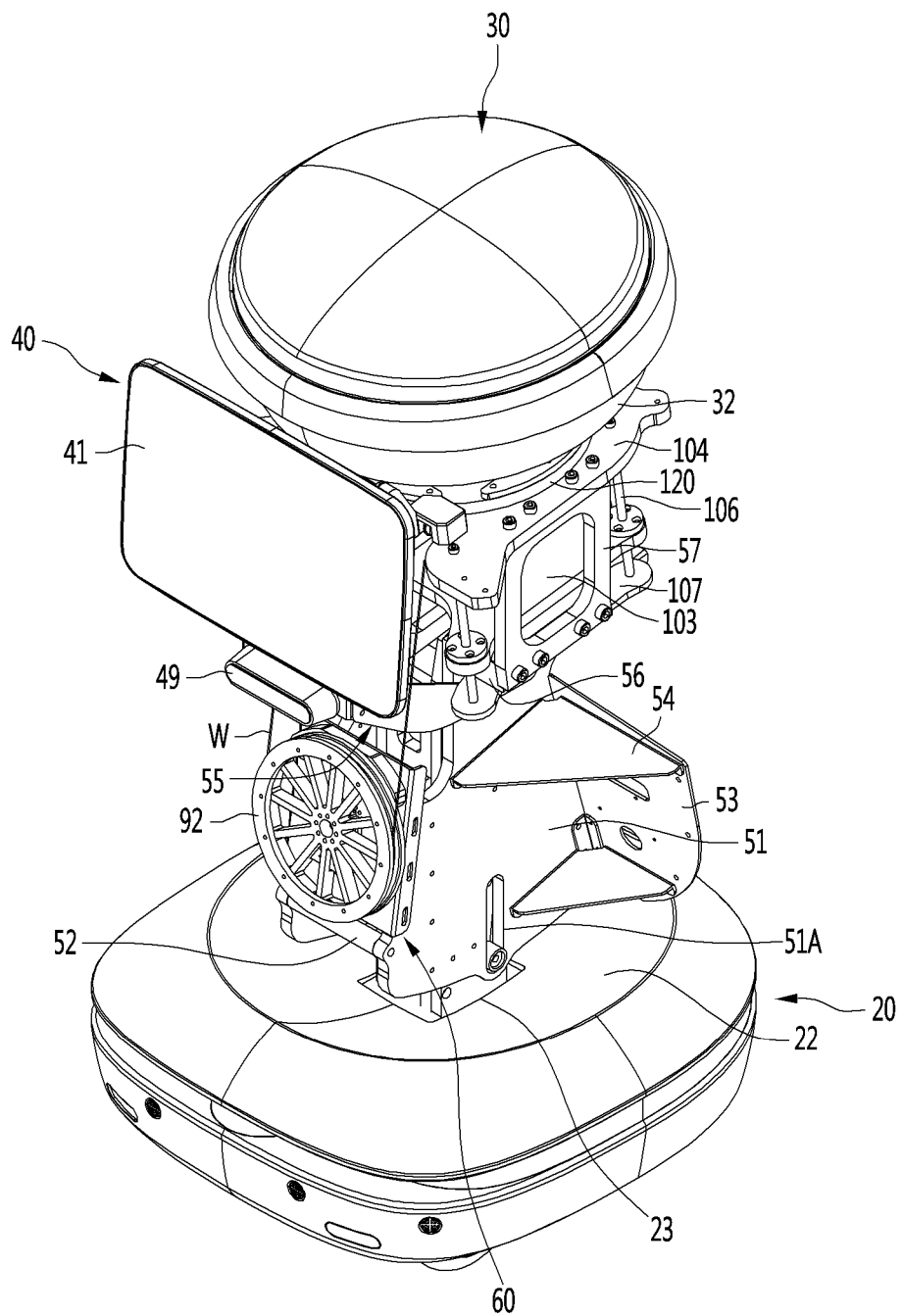
FIG. 8 is a perspective view illustrating a state in which a casing of a robot according to an embodiment of the present disclosure is removed.
Figure 9:
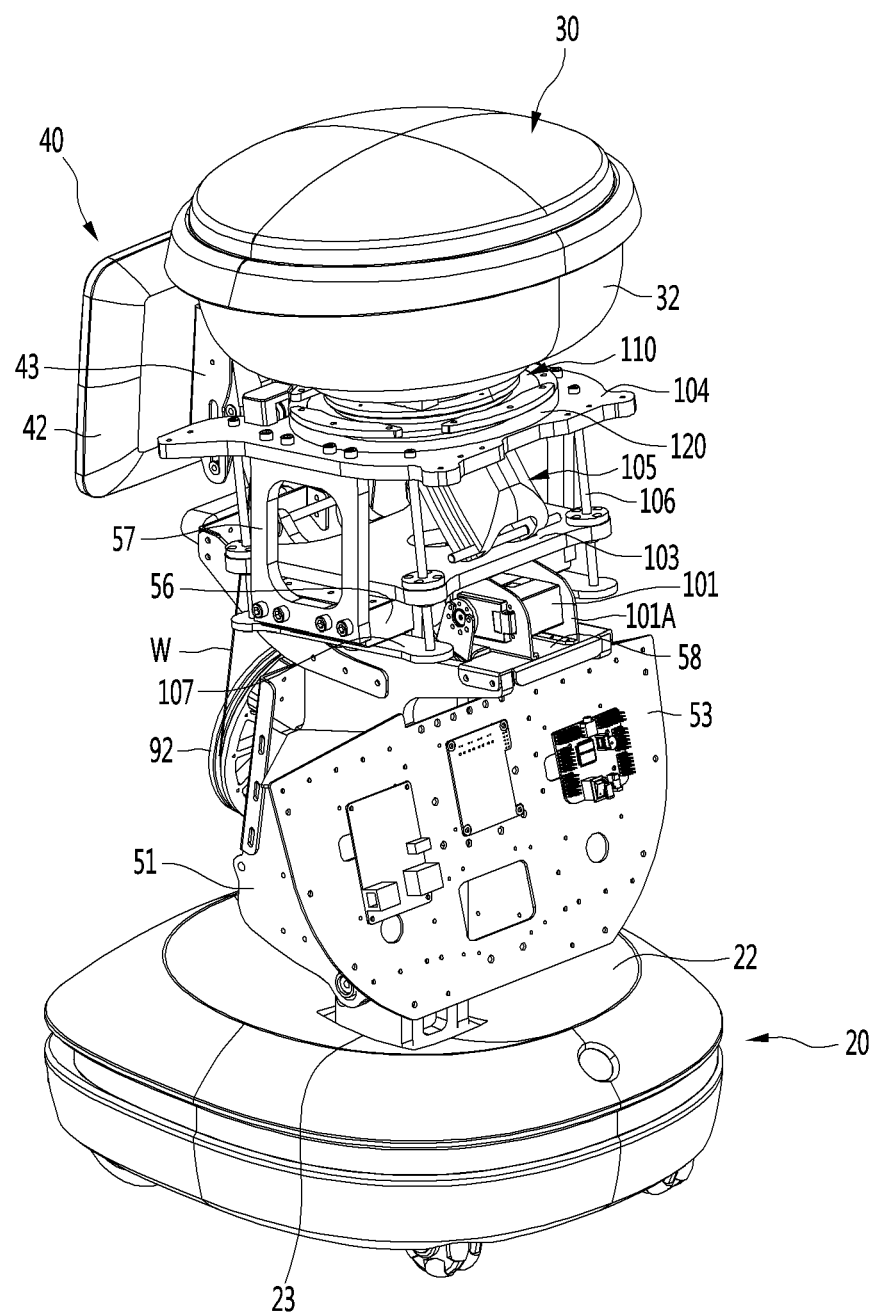
FIG. 9 is a perspective view illustrating, in another direction, a state in which a casing of a robot according to an embodiment of the present disclosure is removed.
Figure 10:
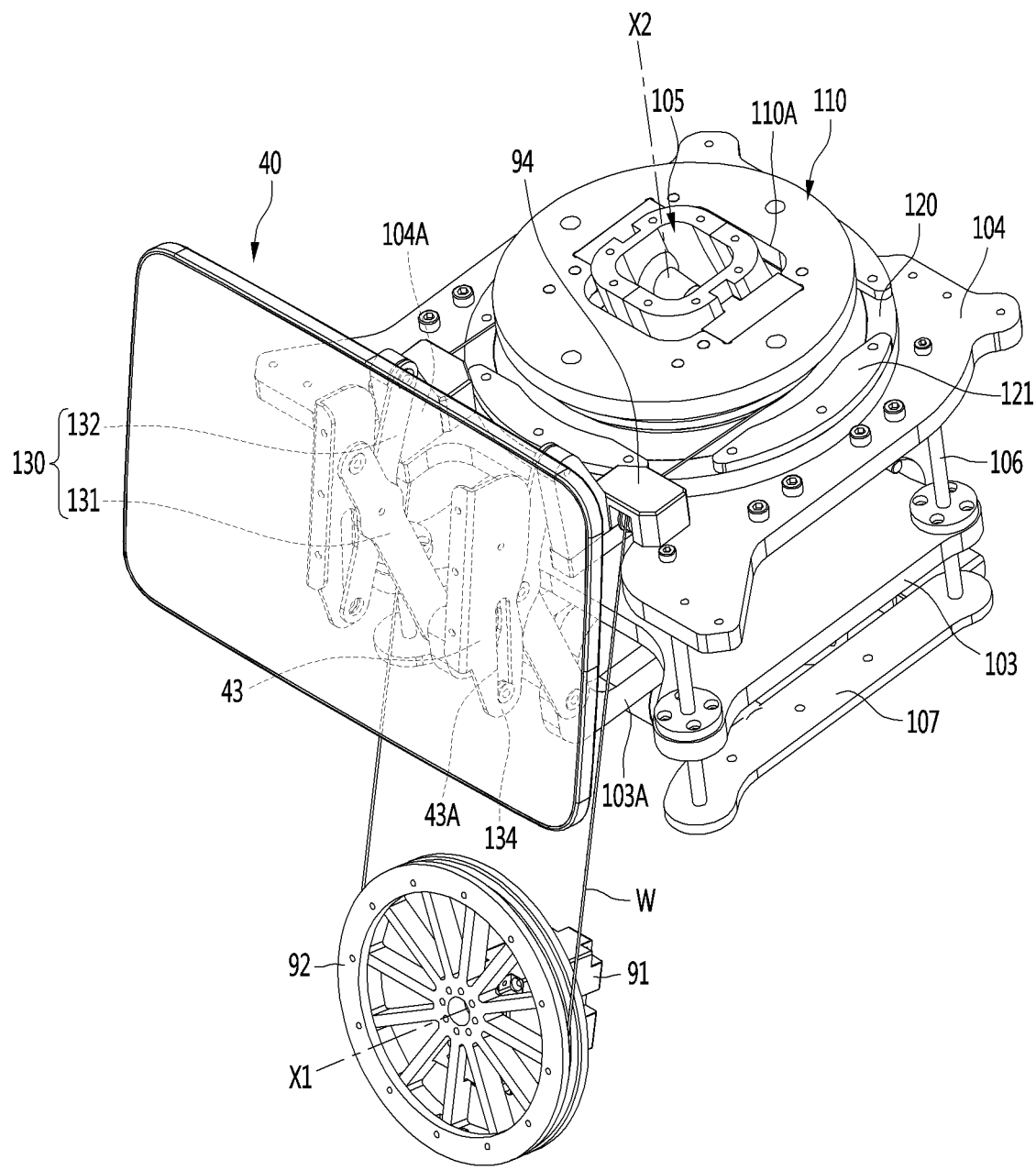
FIG. 10 illustrates a driving mechanism according to an embodiment of the present disclosure.
Figure 11:
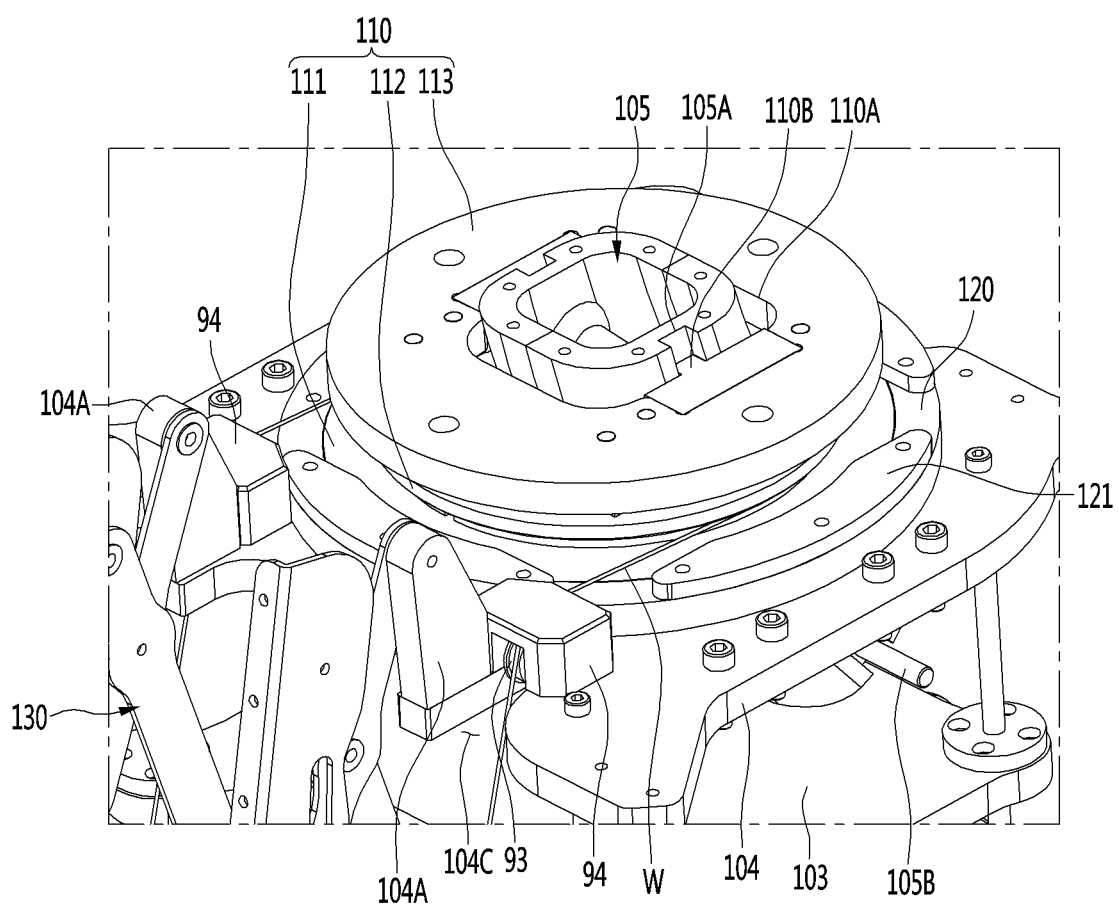
FIG. 11 is an enlarged view of a portion of the driving mechanism illustrated in FIG. 10.
Figure 12:
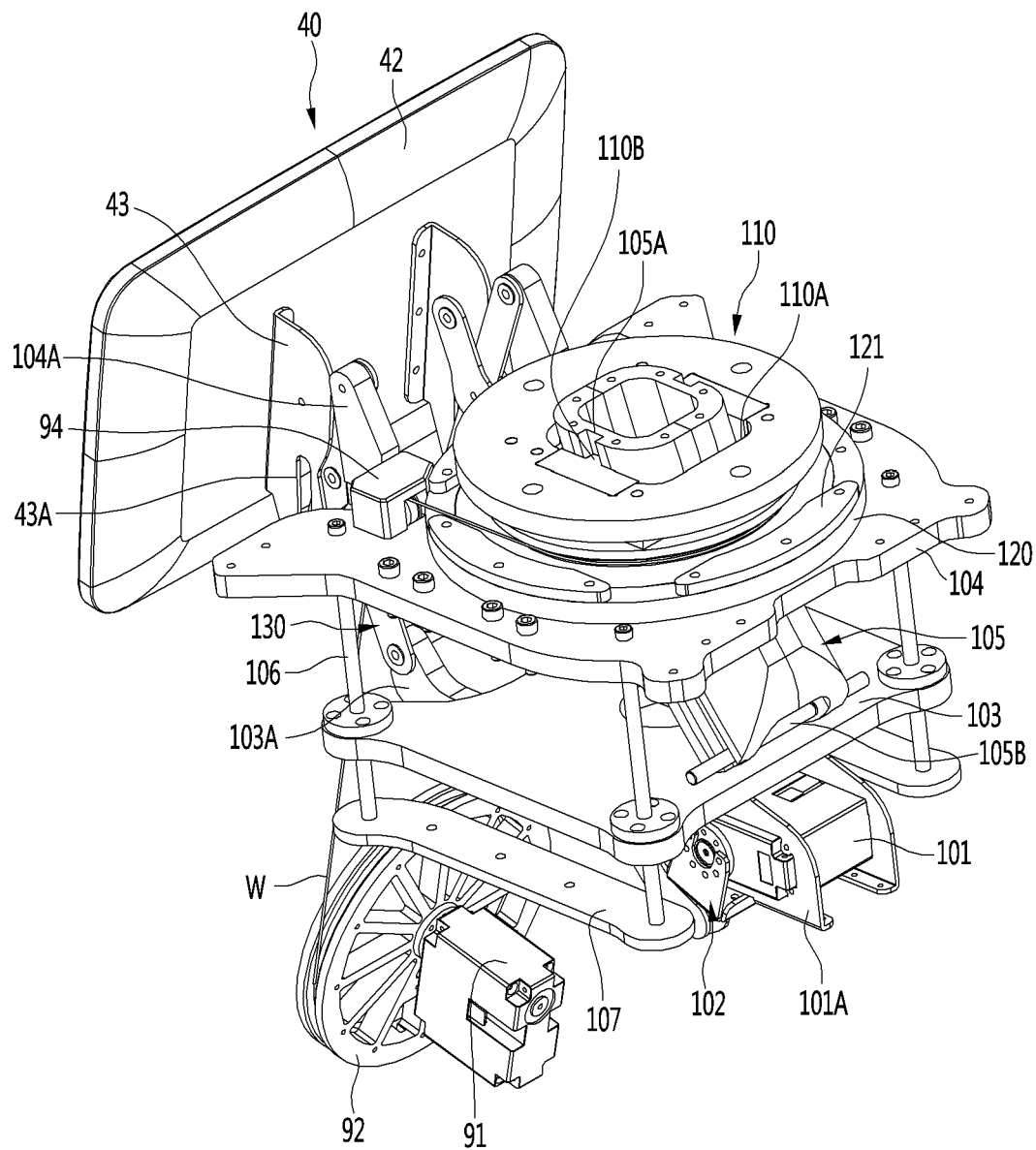
FIG. 12 illustrates the driving mechanism illustrated in FIG. 10 in another direction.
Figure 13:
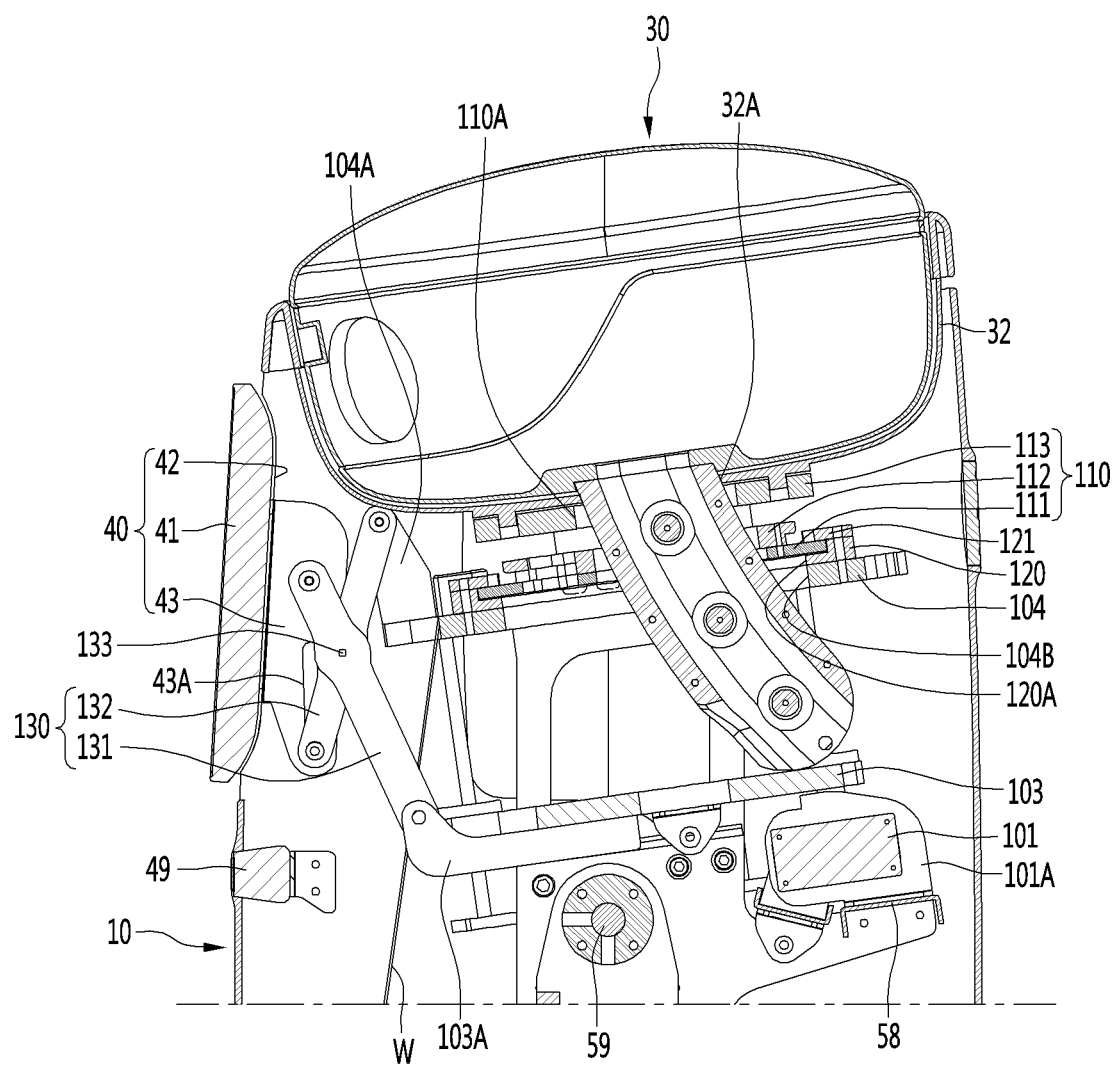
FIG. 13 is a cross-sectional view in which an internal upper portion of a robot according to an embodiment of the present disclosure is enlarged.

The base 20 may have a depression 22 concavely forward in a top face of the base 20. The casing 10 may be positioned in the depression 22. The base 20 may include a vehicle 24A and 24B (see FIG. 6). The vehicle 24A and 24B may drive the robot. In addition, the base 20 may include at least one sensor for sensing a surrounding environment of the robot. In one example, the base 20 may be provided with a plurality of ultrasonic sensors.

Figure 3A:
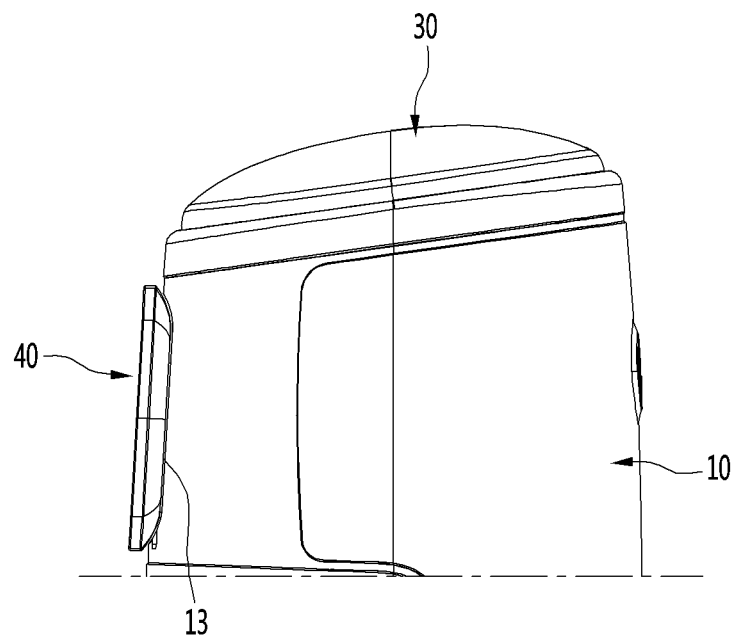
FIGS. 3A to 3C are schematic diagrams illustrating a head unit and a display unit of a robot according to an embodiment of the present disclosure that are tilting relative to a casing.
Figure 3B:
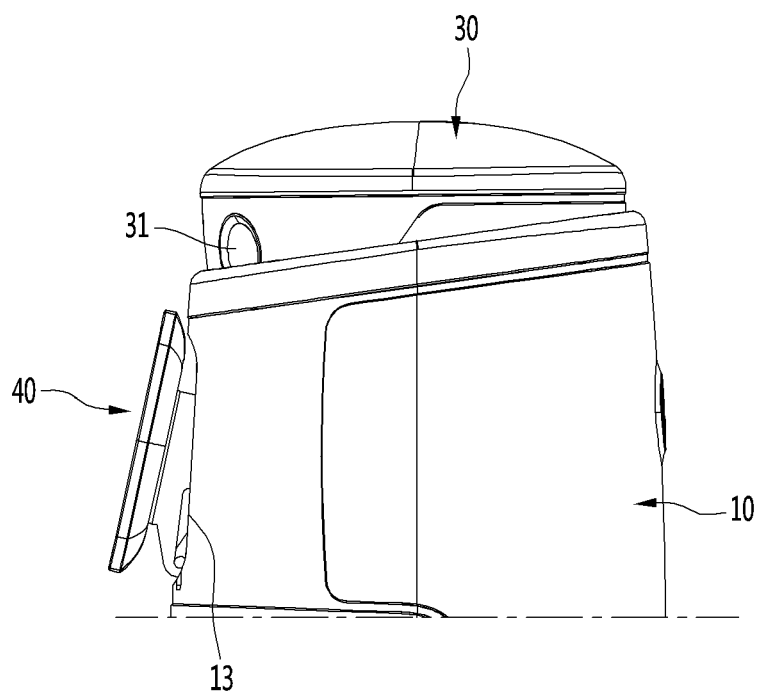
Figure 3C:
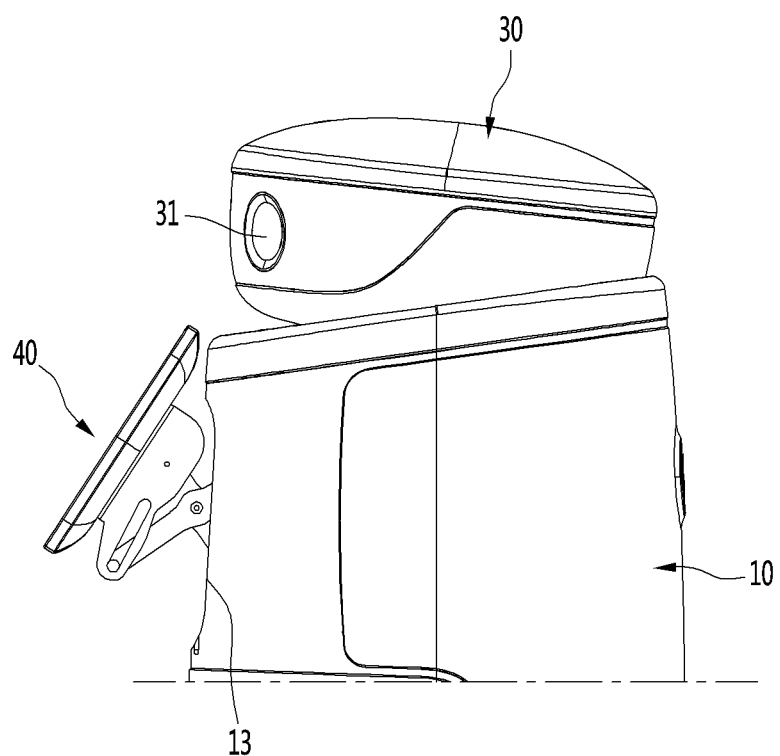

Referring to FIGS. 3A-3C, the robot according to an embodiment may enter either an inactive mode, a stand-by mode, or an active mode based on a command of a user or a predetermined condition. The inactive mode may include a case in which the robot is in an off state. The head 30 and the display 40 may be gradually tilted upward as the robot, enters the stand-by mode and/or the active mode from the inactive mode.

When the robot is in the inactive mode, at least a portion of the head 30 may be received in the casing 10, as shown in FIG. 3a. In this case, the first display 31 of the head 30 may be hidden in the casing 10. This may allow the first display 31 to be safely protected, and prevent unnecessary power consumption.

In addition, when the robot is in the inactive mode, the rear face of the display unit 40 may be in contact with or adjacent to the casing 10. The display unit 40 may be seated on a unit seating part (or display seat) 13. A portion of the front face of the casing 10 may be depressed rearwardly to define the display seat 13.

When the robot is in the stand-by mode, a portion of the head 30 may protrude upwardly from the casing 10, as shown in FIG. 3b. In this case, a first portion of the first display 31 of the head 30 may protrude upwardly from the casing 10, while a second portion thereof may be hidden in the casing 10.

Further, when the robot is in the stand-by mode, the rear face of the display 40 may be spaced apart from the casing 10. The display 40 may be spaced apart from the display seat 13 by a first predetermined amount.

When the robot is in the active mode, at least a portion of the head 30 may protrude upwardly from the casing 10, as shown in FIG. 3c. In this case, the first display 31 of the head 30 may protrude upwardly from the casing 10 and be fully exposed outside of the casing 10. This allows the user to intuitively recognize that the robot is in the active mode.

Further, when the robot is in the active mode, the rear face of the display 40 may be further away from the casing 10. The display 40 may extend from the display seat 13 by a second predetermined amount greater than the first predetermined amount. Accordingly, the user may view the head 30 and the display 40 and recognize the mode of the robot.

Figure 4A:
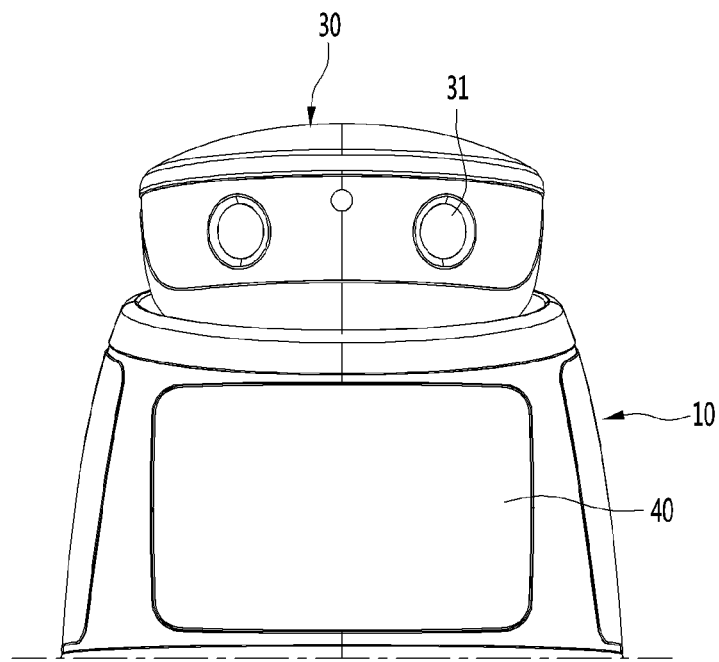
FIGS. 4A to 4C are schematic diagrams illustrating a head unit of a robot according to an embodiment of the present disclosure that is rotating relative to a casing.
Figure 4B:
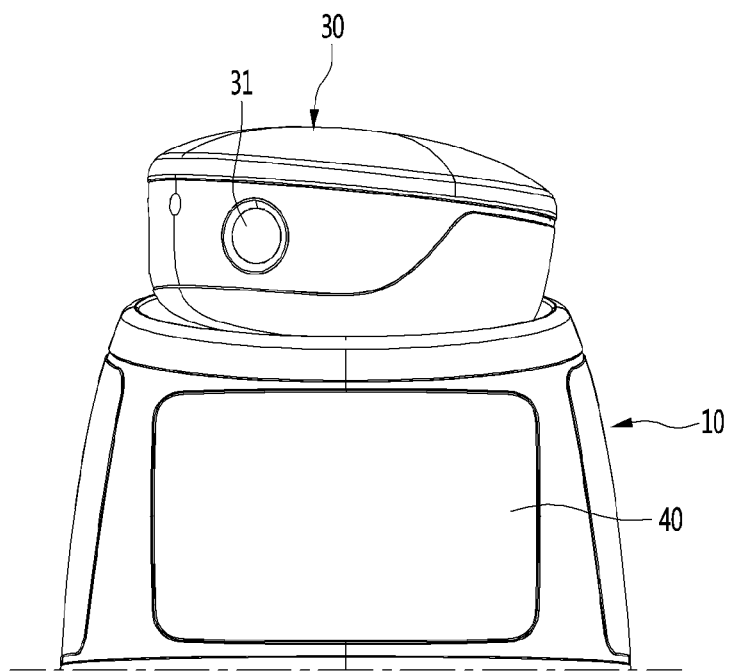
Figure 4C:
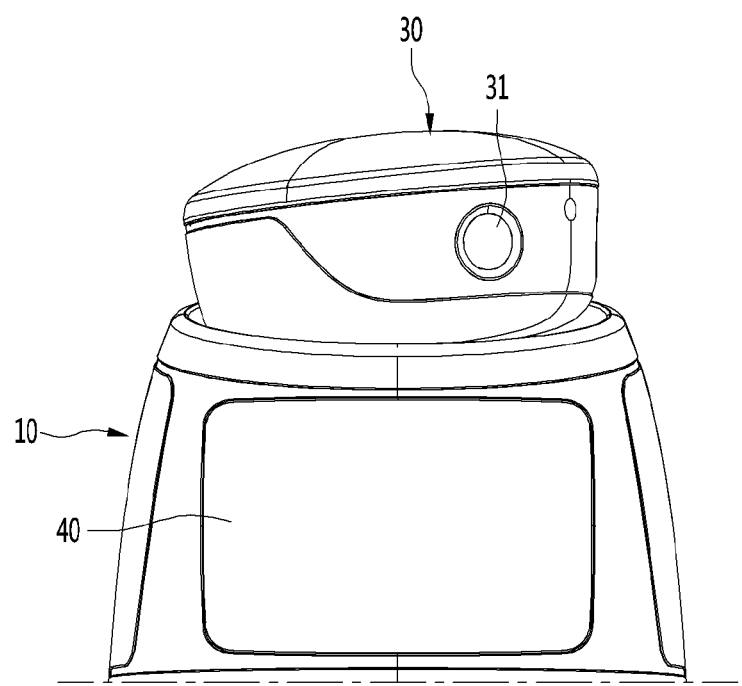

The head 30 may rotate left and right relative to the casing 10. FIG. 4A illustrates the head 30 facing forward. Further, FIG. 4B illustrates the head 30 rotated in a first direction. Further, FIG. 4C illustrates the head 30 rotated in a second direction.

When the head 30 rotates while in a state of being tilted upward, the first display 31 may remain exposed from the casing 10 without being hidden in the casing 10. Even though the head 30 rotates, a facing direction of the first display 31 may remain tilted upward relative to a horizontal line.

Thereby, the head 30 may operate naturally and resemble a person turning their head. Further, the head 30 may rotate while the first display 31 remains directed toward a face of the user. Therefore, the user may feel affinity with the robot.

The casing 10 may be tilted back and forth relative to the base 20. Further, the head 30 and the display 40 may be tilted together with the casing 10. Therefore, angular ranges that the head 30 and the display 40 may face may increase.

Figure 5A:
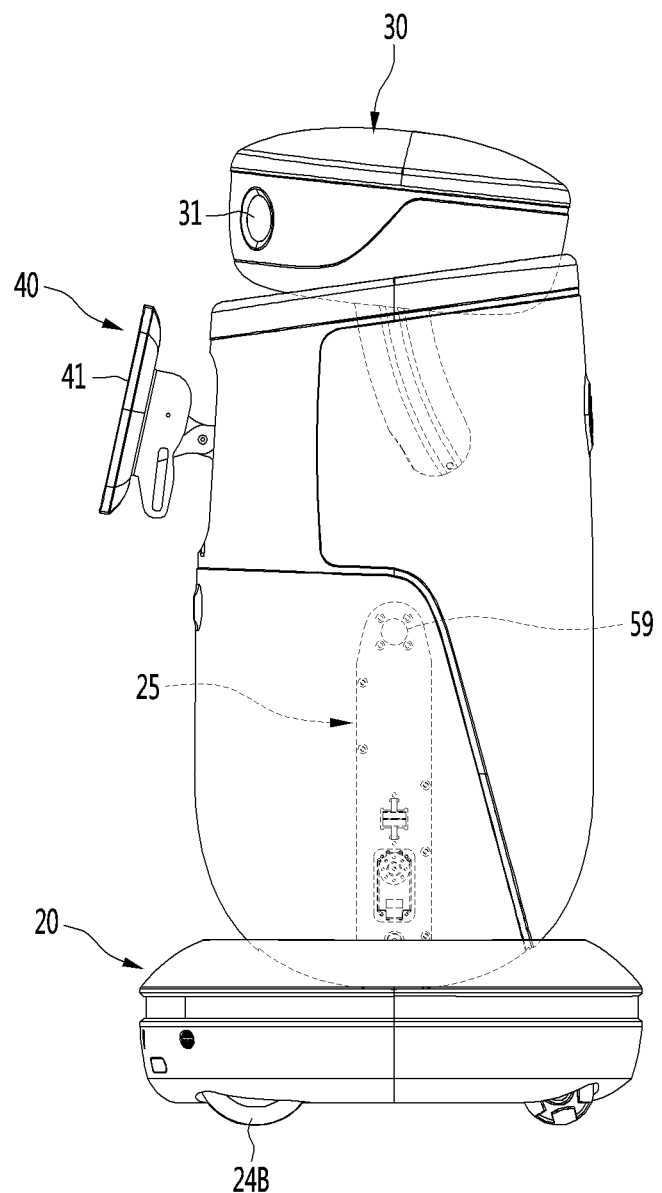
FIGS. 5A to 5C are schematic diagrams illustrating a casing of a robot according to an embodiment of the present disclosure that is tilting relative to a base.
Figure 5B:
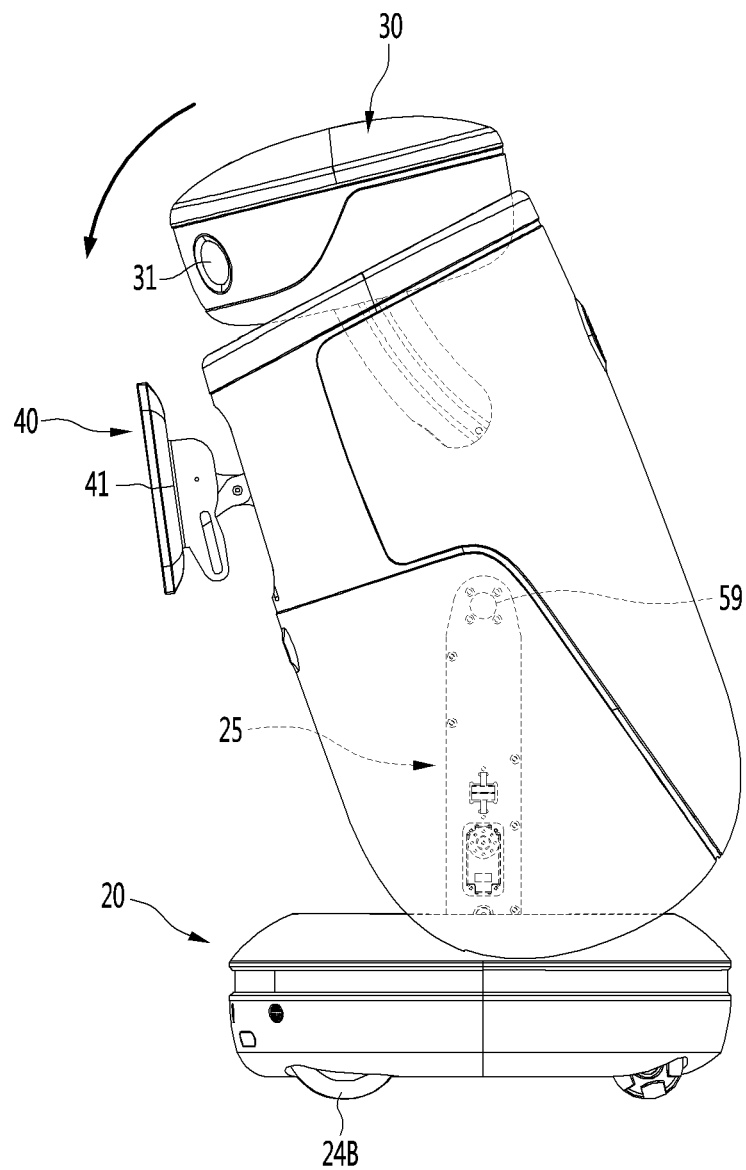
Figure 5C:
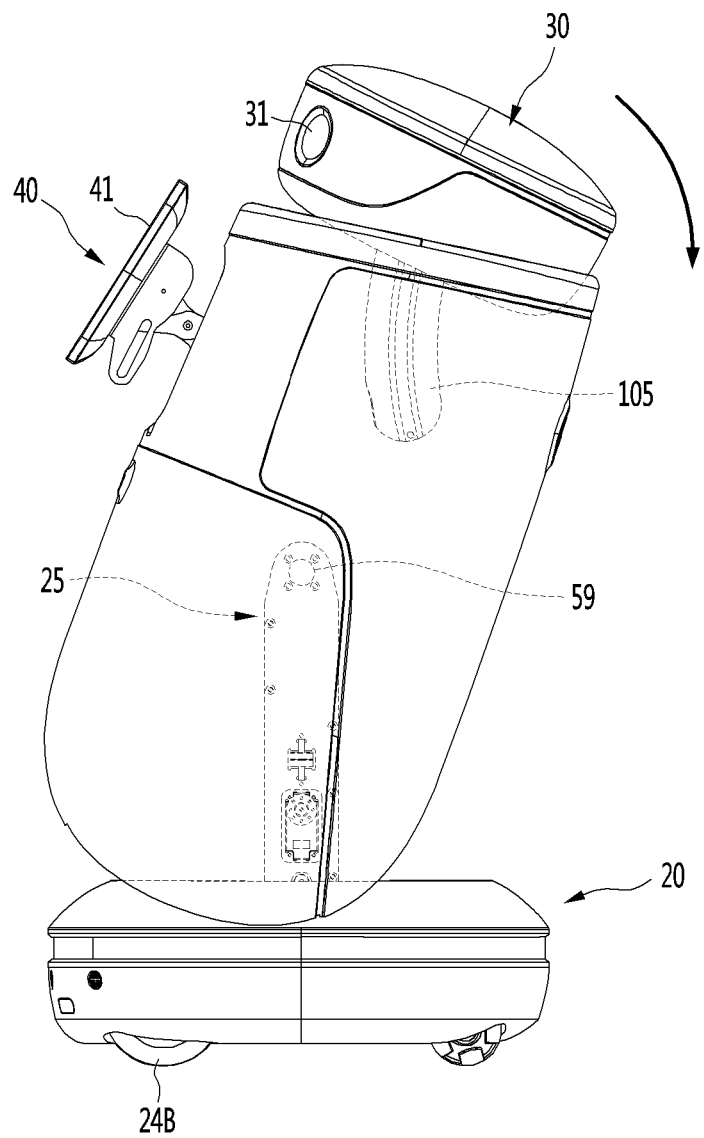

FIG. 5A illustrates the casing 10 that is not tilted. Further, FIG. 5B illustrates the casing 10 tilted forwardly. Further, FIG. 5C illustrates the casing 10 tilted rearwardly. The robot may include a column (or frame column) 25 that protrudes upward from the base 20. A tilting shaft 59 may be connected to the column 25. The casing 10 may be tilted about the tiling shaft 59.

The column 25 may protrude from the base 20 into the casing 10. The tilting shaft 59 may be connected to an upper portion of the column 25. The tilting shaft 59 may extend in a right and left or horizontal direction. Thereby, various operations based on the travel of the robot may be realized.

In one example, when the robot movies in a forward direction, the casing 10 may be tilted forward. As the robot advances faster, the casing 10 may be gradually tilted further forward. On the other hand, when the robot moves in a backward direction, the casing 10 may be tilted rearward. As the robot reverses faster, the casing 10 may be gradually tilted further rearwardly.

In another example, the robot may travel while tilting the casing 10 back and forth at regular intervals. That is, the robot may travel with the casing 10 swinging back and forth relative to the base 20.

Referring to FIGS. 6-9, the casing 10 may include a front casing 11 and a rear casing 12. The rear casing 12 may be fastened at a rear portion of the front casing 11. The front casing 11 and the rear casing 12 may define an internal space of the casing 10 together.

The casing 10 may include the display seat 13 on which the display 40 is seated. The display seat 13 may be depressed rearwardly from a front face of the front casing 11. The display 40 may be seated on a front face of the display seat 13.

A link passing hole 14 may be defined in the casing 10. The link passing hole 14 may be defined in the display seat 13 of the front casing 11 to pass through the display seat 13 in a back and forth direction. The link passing hole 14 may include a plurality of link passing holes. The link passing hole 14 may be a hole elongated in an up and down or vertical direction.

A link (or linkage) 130 (see FIG. 7) connected to the display 40 may pass through the link passing hole 14. When the display 40 is seated on the display seat 13, a link connector 43 (see FIG. 7) of the display 40 may be positioned in the link passing hole 14. When the display 40 is tilted upward and separated from the display seat 13, the link 130 connected to the link connector 43 may pass through the link passing hole 14.

A through-hole 15 in which the sensor 49 is disposed may be defined in the casing 10. The through-hole 15 may be defined in the front face of the front casing 11 so as to pass through the front face of the front casing 11 in a back and forth direction. The through-hole 15 may be positioned below the display seat 13.

The base 20 may include a base housing 21 and a base plate 24. The base housing 21 may form an outer surface of the base 20. A space may be defined in the base housing 21. A rear face of the base housing 21 may be opened. The base plate 24 may cover the open rear face of the base housing 21.

The base plate 24 may be arranged horizontally. The base plate 24 may include the vehicle 24A and 24B. The vehicle 24A and 24B may include a driving motor 24A and a driving wheel 24B connected to the driving motor 24A. The driving motor 24A may include a pair of driving motors and the driving wheel 24B may include a pair of driving wheels.

The driving motor 24A may be received in the internal space of the base housing 21. The driving wheel 24B may be rotated via power of the driving motor 24A to drive the robot.

The column 25 may be formed to extend in an up and down or vertical direction. Preferably, the column 25 may be erected vertically. The column 25 may protrude upward from the base plate 24. A bottom end of the column 25 may be supported and fixed by the base plate 24.

The column 25 may include a pair of column panels 26 spaced apart from each other in a left and right direction. Each of the column panels 26 may extend vertically.

A tilting motor 27 for tilting the casing 10 relative to the base 20 may be disposed between the pair of column panels 26. The tilting motor 27 may be embedded in the column 25. Thereby, the tilting motor 27 may be safely protected.

Two tilting shaft receiving holes 26A into which the tilting shaft 59 is rotatably inserted may be defined in an upper portion of the column 25. The two tilting shaft receiving holes 26A may be respectively defined to pass through upper portions of the pair of column panels 26 in a left and right or horizontal direction.

The tilting motor 27 may be positioned below the tilting shaft 59. A vertical dimension H1 between the base 20 and the tilting motor 27 may be smaller than a vertical dimension H2 between the base 20 and the tilting shaft 59. Thus, even when an external impact or the like is transmitted to the tilting shaft 59, an impact transmitted to the tilting motor 27 may be relatively small.

A column passing hole 23 through which the column 25 passes may be defined in the base housing 21. The column passing hole 23 may pass through the base housing 21 in a vertical direction. The column 25 may pass through the column passing hole 23 and enter the casing 10.

An open portion 10A through which the column 25 passes may be defined in a lower portion of the casing 10. The open portion 10A may be defined in a manner to pass through a rear face of the casing 10. The open portion 10A may be elongated in a back and forth direction. Therefore, the casing 10 may be smoothly tilted relative to the base 20 without interfering with the column 25.

In the base 20, the depression 22 may be concave downward in the top face of the base housing 21. The casing 10 may be positioned in the depression 22. The column passing hole 23 may be defined in the depression 22.

The casing 10 may be smoothly tilted in a back and forth direction without interfering with the base 20. In this connection, the robot according to an embodiment may include an inner frame 50 tiltably fastened to the column 25.

The inner frame 50 may be tiltably connected to the column 25 such that the casing 10 connected to the inner frame 50 may be tilted relative to the base 20 in a back and forth direction. The inner frame 50 may be tilted together with the casing 10 in the back and forth direction.

The inner frame 50 may support components embedded in the casing 10. The inner frame 50 may support a rotating motor 91, an ascending and descending motor (or lift motor) 101, and a fixing plate (or fixed plate) 104, which will be described below. The inner frame 50 may also support the sensor 49.

The inner frame 50 may include a pair of main panels 51 spaced apart from each other in a left and right direction. The pair of main panels 51 may be positioned on opposite sides around the column 25. That is, the column 25 may be positioned between the pair of main panels 51. The pair of main panels 51 may be arranged in parallel. The pair of main panels 51 may face away from each other.

The inner frame 50 may include a supporter 57 for supporting the fixing plate 104 and a connecting part 56 for connecting the supporter 57 and each of the main panels 51. The supporter 57 may be fastened to the fixing plate 104. The supporter 57 may support the fixing plate 104 from below. the supporter 57 may be arranged vertically.

The supporter 57 may have a plate shape with both sides thereof respectively facing left and right. The supporter 57 may include a pair of supporters spaced apart from each other in a left and right direction. The pair of supporters may be respectively fastened to left and right edges of the fixing plate 104. An ascending and descending plate (or lifting plate) 103 to be described below may be positioned between the pair of supporters.

The connecting part 56 may be of a block shape formed to extend in a back and forth direction. The connecting part 56 may be positioned between the supporter 57 and the main panel 51 to connect the supporter 57 and each of the main panels 51.

The connecting part 56 may be fastened to an outer face of a top end of each of the main panels 51. The outer face of each of the main panels 51 may refer to a face among both faces of each of the main panels 51 facing an inner face of the casing 10. Further, the connecting part 56 may be fastened to an inner face of a bottom end of the supporter 57. The inner face of the supporter 57 may refer to a face among both faces of the supporter 57 opposite to the other face facing the inner face of the casing 10.

The inner frame 50 may include a connecting bar 52 connecting the pair of main panels 51. The connecting bar 52 may be a bar extending in a left and right direction.

The connecting bar 52 may connect front edges of the pair of main panels 51 with each other. The connecting bar 52 may connect lower portions of the front edges of the pair of main panels 51 with each other. The connecting bar 52 may be positioned in front of the column 25.

When the inner frame 50 is tilted rearward relative to the column 25, the connecting bar 52 may be hooked to the column 25. The connecting bar 52 may serve as a limiter that limits an extent to which the inner frame 50 and the casing 10 are tilted rearwardly.

The inner frame 50 may include a motor installation part or mount 58 on which the ascending and descending motor 101 to be described below is installed. The ascending and descending motor 101 may be directly fastened to the motor installation mount 58. Alternatively, an ascending and descending motor bracket 101A (see FIG. 9) to which the ascending and descending motor 101 is equipped may be fastened to the motor installation mount 58.

The motor installation mount 58 may be of a plate shape that is level or inclined. The motor installation mount 58 may support the ascending and descending motor 101 from below. The motor installation mount 58 may be fastened to a protrusion 51C protruding rearwardly from each of the main panels 51. The protrusion 51C may protrude rearwardly from a rear edge of each of the main panels 51. Further, the motor installation mount 58 may be fastened at an upper portion of the protrusion 51C.

The protrusion 51C may be formed on an upper portion of the rear edge of each of the main panels 51. The protrusion 51C may include a pair of protrusions. The motor installation mount 58 may connect the pair of protrusions respectively formed on the pair of main panels with each other.

The inner frame 50 may include a rear panel 53 facing in a rear direction. The rear panel 53 may be fastened at a rear portion of the pair of main panels. The rear panel 53 may connect rear edges of the pair of main panels with each other. The rear panel 53 may be connected to lower portions of the rear edge of the pair of main panels. The rear panel 53 may be positioned below the protrusion 51C.

A length of the rear panel 53 in a left and right direction may be larger than a length between the pair of main panels in a left and right direction. Various circuit boards necessary for driving the robot may be mounted on a rear face of the rear panel 53.

The inner frame 50 may include one or more reinforcement panels 54 connecting the each of main panels 51 and the rear panel 53. The reinforcement panels 54 may connect the outer face of each of the main panels 51 to a front face of the rear panel 53. Some of the plurality of reinforcement panels 54 may connect an outer face of one of the main panels 51 to the front face of the rear panel 53, and the others may connect an outer face of the other the main panel 51 and the front face of the rear panel 53.

The reinforcement panels 54 may be connected to each of the main panels 51 and the rear panel 53 at right angles. The inner frame 50 may support the sensor 49. The sensor device bracket 55 to which the sensor 49 is equipped may be fastened to the inner frame 50.

The sensor device bracket 55 may be fastened to at least one of the pair of main panels 51. In this connection, the display 40 may include the second display 41, a rear cover 42 for covering the second display 41 from the rear, and a link connector 43 provided on the rear cover 42. The rear cover 42 may be in contact with the display seat 13 of the front casing 11.

The link connector 43 may be provided on a rear face of the rear cover 42. The link connector 43 may be inserted into the link passing hole 14 of the front casing 11. A link 130 to be described below may be connected to the link connector 43.

In this connection, the robot according to an embodiment may include a tilting mechanism for tilting the head 30 and the display 40 together. Further, the robot according to an embodiment may include a rotating mechanism for rotating the head 30. The tilting mechanism and the rotating mechanism may be collectively referred to as a driving mechanism.

The tilting mechanism may include the ascending and descending motor 101, the ascending and descending plate 103, the fixing plate 104, a contact bar (or first bar) 105, a first guide body 110 and the link 130. The ascending and descending motor 101 may be embedded in the casing 10. The ascending and descending motor 101 may be installed on the motor installation part 58 of the inner frame 50.

The ascending and descending motor 101 may lift the lifting plate 103. The lifting plate 103 may be inclined downwards in a forward direction. However, the present disclosure is not limited thereto, and the lifting plate 103 may be arranged horizontally.

The lifting plate 103 may be positioned on the connecting part 56 of the inner frame 50. The lifting plate 103 may be positioned between the pair of supporters of the inner frame 50.

The fixing plate 104 may be positioned above the lifting plate 103. The fixing plate 104 may be positioned between the head unit 30 and the lifting plate 103. The fixing plate 104 may be disposed in parallel to the lifting plate 103. The fixing plate 104 may be fastened to and supported by the supporter 57 of the inner frame 50.

At least one guide bar 106 for guiding the lifting plate 103 may be connected to the fixing plate 104. The guide bar 106 may be elongated in a vertical direction. A top end of the guide bar 106 may be fastened to the fixing plate 104. The guide bar 106 may pass through the lifting plate 103 to guide the lifting plate 103.

The guide bar 106 may include a plurality of guide bars. Some of the plurality of guide bars may be connected to a first side of the fixing plate 104, and the others may be connected to a second side of the fixing plate 104. A bottom end of the guide bar 106 may be connected to a guide bar fixing or bracket part 107. The guide bar fixing bracket 107 may securely fix the guide bar 106 together with the fixing plate 104.

The guide bar fixing bracket 107 may be elongated in a back and forth direction. The guide bar fixing bracket 107 may be a plate parallel to the fixing plate 104.

The guide bar fixing bracket 107 may include a pair of guide bar fixing parts. One of the pair of guide bar fixing parts may be connected to the guide bar 106 connected to one side of the fixing plate 104, the other may be connected to the guide bar 106 connected to the other side of the fixing plate 104.

The guide bar fixing bracket 107 may be positioned under the connecting part 56 of the inner frame 50. The guide bar fixing bracket 107 may be fastened to a rear face of the connecting part 56. The guide bar fixing bracket 107 may protrude in a back and forth direction beyond the connecting part 56. The guide bar 106 may be connected to front and rear protruding portions of the connecting part 56 of the guide bar fixing bracket 107. The guide bar 106 may pass through the connecting part 56 of the inner frame 50 to be connected to the guide bar fixing bracket 107, or a bottom end of the guide bar 106 may be directly connected to the connecting part 56.

The contact bar 105 may be connected to the head 30. A top end of the contact bar 105 may be connected to the head 30, and a bottom end of the contact bar 105 may remain in contact with the lifting plate 103. The contact bar 105 may be in line contact with the lifting plate 103.

The contact bar 105 may pass through the fixing plate 104 and the head receiving cover 32 to be connected to the head 30. The fixing plate 104 may include an opening 104b defined therein through which the contact bar 105 passes. A through-hole 32A through which the contact bar 105 passes may be defined in the head receiving cover 32.

The contact bar 105 may be bent in a direction such that a forward end of the contact bar 105 is higher than a rearward end of the contact bar 105. The contact bar 105 may further be arc-shaped. Therefore, when the lifting plate 103 presses the contact bar 105 vertically, the head 30 may be both tilted and lifted.

The first guide body 110 may be positioned above the fixing plate 104. The first guide body 110 may be positioned between the fixing plate 104 and the head receiving cover 32. The first guide body 110 may have a substantially disk shape.

The first guide body 110 may be fastened to the head receiving cover 21. The first guide body 110 may guide a movement of the contact bar 105. The contact bar 105 may pass through the first guide body 110.

The link 130 may connect the lifting plate 103 and the fixing plate 104 to the display 40. The link 130 may be connected to the link connector 43 of the display 40.

The link 130 may be rotatably connected to a first connector 103A provided on the lifting plate 103. The first connector 103A may be fastened to a rear face of the lifting plate 103. The first connector 103A may be elongated in a back and forth direction. The first connector 103A may protrude forward beyond the lifting plate 103. The link 130 may be rotatably connected to a front end of the first connector 103A.

The link 130 may be rotatably connected to a second connector 104A provided on the fixing plate 104. The second connector 104A may be fastened onto a top face of the fixing plate 104. The second connector 104A may be fastened to a front edge of the fixing plate 104.

In one example, the link 130 may be directly connected to respective front edges of the lifting plate 103 and the fixing plate 104. When the lifting plate 103 is ascended, a length of the link 130 in the horizontal direction may be increased, and the display 40 may be moved forward and tilted upward. Conversely, when the lifting plate 103 descends, the length of the link 130 in the horizontal direction may be reduced, and the display 40 may be moved rearward and tilted downward.

In this connection, the rotating mechanism may include the rotating motor 91, a rotating wheel 92, a wire W, the first guide body 110, and a second guide body 120. The rotating motor 91 may be embedded in the casing 10. The rotating motor 91 may be installed in the inner frame 50. More specifically, a rotating motor bracket 91A on which the rotating motor 91 is mounted may be installed on the inner frame 50.

The rotating motor bracket 91A may be fastened in front of the inner frame 50. The rotating motor bracket 91A may connect the front edges of the pair of main panels 51 to each other. The rotating motor bracket 91A may be positioned above the connecting bar 52.

The rotating motor 91 mounted on the rotating motor bracket 91A may be positioned between the pair of main panels 51. This may allow the rotating motor 91 to be safely protected.

The rotating motor 91 may be positioned at a lower height than the lift motor 101. More specifically, a vertical dimension H3 between the base 20 and the rotating motor 91 may be smaller than a vertical dimension H4 between the base 20 and the lift motor 101.

The rotating motor 91 may rotate the head 30. More specifically, the rotating motor 91 may rotate the first guide body 110. In addition, the head 30 and the contact bar 105 may rotate together with the first guide body 110. Thus, the first guide body 110 may be rotatably disposed above the fixing plate 104.

The rotating wheel 92 may be connected to the rotating motor 91. The rotating wheel 92 may be positioned in front of the rotating motor bracket 91A. The wire W may transmit rotational force of the rotating wheel 92 to the first guide body 110. The wire W may form a single closed curve surrounding a portion of an outer circumference of the first guide body 110 and a portion of an outer circumference of the rotating wheel 92.

The second guide body 120 may guide a rotation of the first guide body 110. The second guide body 120 may be fixed on the fixing plate 104. The second guide body 120 may have an annular shape surrounding the outer circumference of the first guide body 110. The second guide body 120 may include at least one arc. A height of the second guide body 120 may be smaller than a height of the first guide body 110. Accordingly, the second guide body 120 may surround a bottom outer circumference of the first guide body 110.

When the rotating motor 91 rotates the rotating wheel 92, the rotational force of the rotating wheel 92 may be transmitted to the first guide body 110 by the wire W. The first guide body 110 may be rotated with respect to the second guide body 120. The contact bar 105 passing through the first guide body 110 and the head 30 connected to the contact bar 105 may rotate together with the first guide body 110.

Further, as described above, the first guide body 110 may be fastened to a rear face of the head receiving cover 32. Thus, the head receiving cover 32 may also rotate with the first guide body 110. However, the present disclosure is not limited thereto. When the head receiving cover 32 is fixed to the casing 10 without being fastened to the first guide body 110, the head receiving cover 32 may not rotate.

Referring to FIGS. 10-13, the first guide body 110 may include a lower body 111, a middle body 112, and an upper body 113. The lower body 111, the middle body 112, and the upper body 113 may be fastened together and rotated together. Two or more of the lower body 111, the middle body 112, and the upper body 113 may be integrally formed.

The lower body 111 may be in a form of a disk. The lower body 111 may be rotatably provided above the fixing plate 104. The lower body 111 may be positioned inside the second guide body 120. The second guide body 120 may surround outer circumference of the lower body 111.

The middle body 112 may be in a form of a disk. The middle body 112 may be fastened to a top face of the lower body 111. The middle body 112 may be positioned between the lower body 111 and the upper body 113.

The wire W may be wound around a portion of the outer circumference of the middle body 112. The wire W may rotate the middle body 112 without slipping relative to the middle body 112. In one example, the wire W may have at least one latching portion (e.g., a knot), and the outer circumference of the middle body 112 may include a latching groove for receiving the latching portion.

A diameter of the middle body 112 may be smaller than a diameter of the lower body 111 and the upper body 113. Therefore, the wire W may not be separated upward or downward. The upper body 113 may be in a form of a disk. the upper body 113 may be positioned on the upper side of the middle body 112. The upper body 113 may be fastened to the head receiving cover 32.

The lower body 111, the middle body 112, and the upper body 113 may each include a through-hole 110A defined therein through which the contact bar 105 passes. The first guide body 110 may include a guide rib 110b to be inserted in a guide groove 105A defined in the contact bar 105. The guide groove 105A may include a pair of guide grooves defined in both sides of the contact bar 105.

The elongated guide groove 105A may be defined in the contact bar 105 and extend in a length direction of the contact bar 105. A guide block may be fastened to the upper body 113, and the guide rib 110b may be formed on the guide block. The guide block may be fastened to a top face of the middle body 112.

However, the present disclosure is not limited thereto. In addition, the guide rib 110b may protrude inward from at least one through-hole 110A of the lower body 111, the middle body 112, and the upper body 113

A stopper 105B may be provided at the bottom end of the contact bar 105. The stopper 105b may contact a rear face of the fixing plate 104 when the lifting plate 103 is lifted to a certain height. The stopper 105B may be cylindrical and extend in a left and right direction. The stopper 105B may have a length sufficient so that it does not pass through the opening 104b defined in the fixing plate 104.

The opening hole 104B defined in the fixing plate 104 may be larger than the through-hole 110A defined in the first guide body 110. An inner circumference of the opening 104B may be spaced apart from the contact bar 105. This is because the contact bar 105 rotating together with the first guide body 110 has a turning radius greater than a thickness of the contact bar 105.

Likewise, an inner diameter of the second guide body 120 may also be larger than an inner diameter of the through-hole 110A defined in the first guide body 110. The inner diameter of the second guide body 120 may be equal to or similar to the inner diameter of the opening 104B defined in the fixing plate 104. Thus, the contact bar 105 may easily rotate without interfering with the fixing plate 104 and the second guide body 120.

The second guide body 120 may include a deviation preventing part (or alignment plate) 121 that prevents the first guide body 110 from deviating. The deviation preventing part 121 may be fastened to the top face of the second guide body 120. The deviation preventing part 121 may be roughly arc shaped, but is not limited thereto.

The deviation preventing part 121 may include a plurality of deviation preventing parts. The plurality of deviation preventing parts may be spaced apart from each other in a circumferential direction of the second guide body 120. The wire W may pass between adjacent deviation preventing parts.

The deviation preventing part 121 may protrude inwardly from the second guide body 120. A portion of the deviation preventing part 121 may be positioned on the lower body 111. Thereby, the lower body 111 may be constrained in a vertical direction.

The fixing plate 104 may include a wire supporting wheel or pulley 93 and a wheel supporter or housing 94. The wire supporting pulley 93 may support the wire W and may be in contact with the wire W. The wire supporting pulley 93 may rotate about a rotation axis formed in a horizontal direction.

The pulley housing 94 may rotatably support the wire supporting pulley 93. The pulley housing 94 may be provided on the top face of the fixing plate 104. The pulley housing 94 may be provided on a front portion of the fixing plate 104. The wire W may pass through an inner portion of the pulley housing 94 while in contact with the wire supporting pulley 93.

The pulley housing 94 may include a pair of supporting parts for supporting the rotation axis of the wire supporting pulley 93 on both sides and a connecting part for connecting upper portions of the pair of supporting parts to each other.

The wire W may pass between the pair of supporting parts. The connecting part may prevent the wire W from deviating upwardly from the pulley housing 94 when a tension applied to the wire W is weak.

The fixing plate 104 may have an interference-avoiding groove (or wire groove) 104C defined therein through which the wire W passes. The interference-avoiding groove 104C may be defined by a front edge of the fixing plate 104 being depressed rearwardly. The pulley housing 94 may be positioned above the interference-avoiding groove 104C. This allows the wire W to be in contact with the wire supporting pulley 93 without interfering with the fixing plate 104.

The wire W may be supported by the wire supporting pulley 93, and the wire supporting pulley 93 may change an extending direction of the wire W. A portion of the wire W between the rotating wheel 92 and the wire supporting pulley 93 may be steeper than a portion between the wire supporting pulley 93 and the first guide body 110.

A virtual rotation axis X1 of the rotating wheel 91 and a virtual rotation axis X2 of the first guide body 110 may not be parallel to each other. More specifically, the virtual rotation axis X1 of the rotating wheel 91 may be tilted to be closer to a horizontal line than to a vertical line, and the virtual rotation axis X2 of the first guide body 110 may be tilted to be closer to a vertical line than to a horizontal line. Accordingly, the wire W may be supported by the wire supporting pulley 93 and an extending direction thereof may be changed such that the rotational force of the rotating wheel 91 may be easily transmitted to the first guide body 110.

The first guide body 110 and the virtual rotational axis X2 of the head 30 may be perpendicular to both faces of the lifting plate 103. When the lifting plate 103 is tilted, the first guide body 110 and the virtual rotational axis X2 of the head 30 may also be inclined without being vertical. Therefore, the rotation operation of the head 30 may become natural.

The wire supporting pulley 93 may include a pair of wire supporting pulleys. In addition, the pulley housing 94 may include a pair of pulley housings. One of the wire supporting pulleys may support a portion of the rotating wheel 92 that faces the first guide body 110. The other of the wire supporting pulleys may support a portion of the first guide body 110 that faces the rotating wheel 92.

The link 130 may connect the lifting plate 103 and the fixing plate 104 to the display 40. The link 130 may include a plurality of links. In one example, the link 130 may include a pair of links spaced apart from each other in a horizontal direction. In this case, the display 40 may include the link connector 43.

The link connector 43 may include a pair of link connectors. Further, the lifting plate 103 may include the first connector 103A. The first connector 103A may include a pair of first connectors. Further, the fixing plate 104 may include the second connector 104A. The second connector 104A may include a pair of second connectors.

The link 130 may include at least one pair of link bars 131 and 132 that intersect with each other. Hereinafter, a case in which the link 130 includes a pair of link bars 131 and 132 will be described as an example. The link 130 may include a first link bar 131 and a second link bar 132. The first link bar 131 and the second link bar 132 may intersect each other to form a joint 133.

The first link bar 131 may be rotatably connected to the link connector 43 of the display 40. Further, the first link bar 131 may be rotatably connected to the first connector 103A provided on the lifting plate 103. A front end of the first link bar 131 may be rotatably connected to the link connector 43, and a rear end of the first link bar 131 may be rotatably connected to the first connector 103A.

The second link bar 132 may be movably connected along an elongate hole 43A defined in the link connector 43 of the display 40. Further, the second link bar 132 may be rotatably connected to the second connector 104A provided on the fixing plate 104. A front end of the second link bar 132 may be movably connected along the elongate hole 43A defined in the link connector 43, and the rear end of the second link bar 132 may be rotatably connected to the second connector 104A.

The elongate hole 43A may pass through the link connector 43 in a horizontal direction. The elongate hole 43A may be elongated in a vertical direction. The elongate hole 43A may be defined below a portion to which the first link bar 131 is connected in the link connector 43.

A projection 134 to be inserted into the elongate hole 43A may be formed at the front end of the second link bar 132. The projection 134 may protrude from a face that faces the link connector 43 among both faces of the second link bar 132 in a direction perpendicular to the face. The projection 134 may move between both ends of the elongate hole 43A while being inserted in the elongate hole 43A. Thus, when the lifting plate 103 is ascended, the display 40 may be moved forward as well as tilted upward.

The power of the lift motor 101 may be transmitted to the lifting plate 103 via a power transmitting part or linkage 102. The power transmitting linkage 102 may convert the rotational force of the lift motor 101 into a force acting in a vertical direction of the lifting plate 103.

Figure 14A:
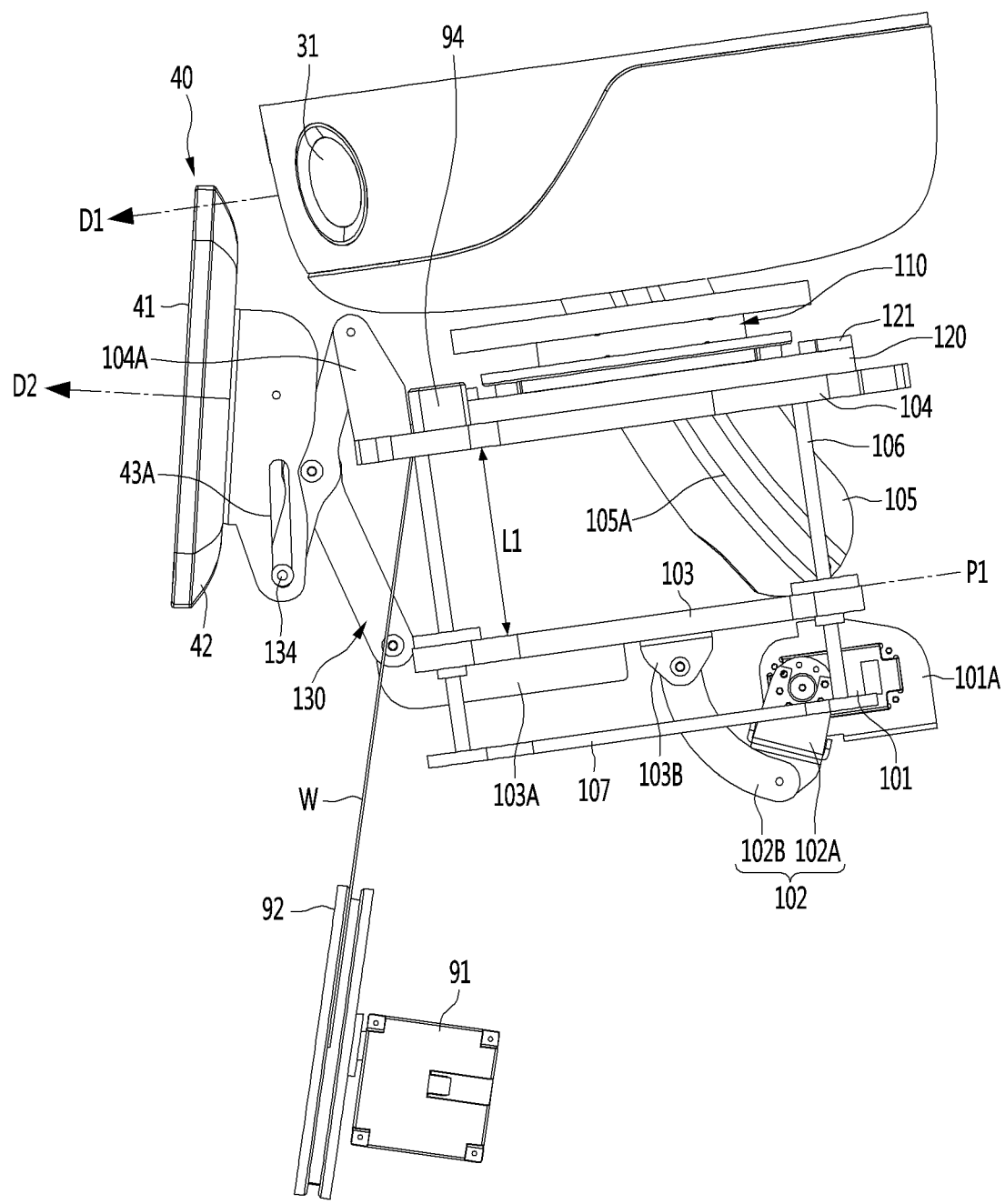
FIGS. 14A and 14B are side views for illustrating a tilting process of a head unit and a display unit according to an embodiment of the present disclosure.
Figure 14B:
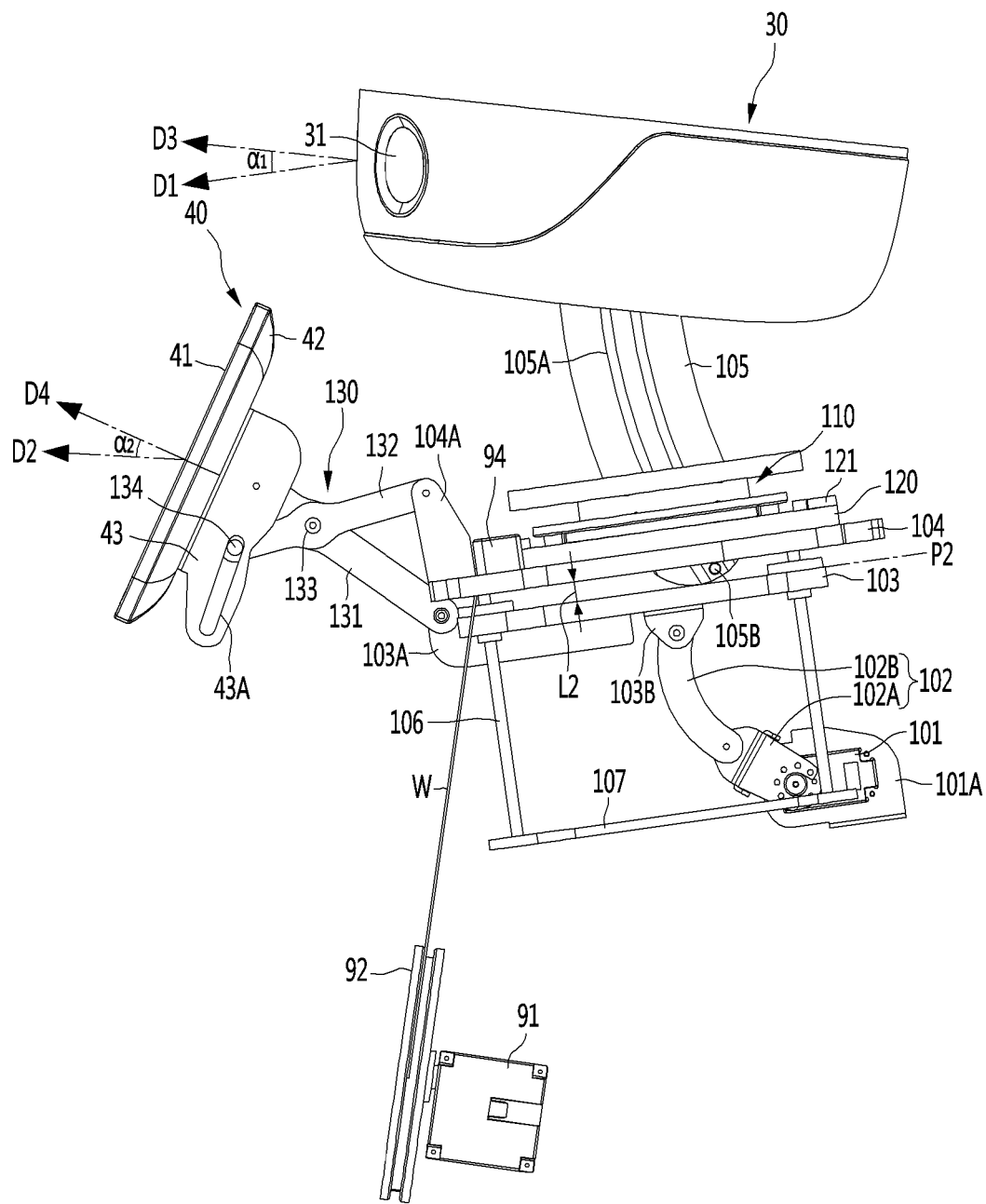

The power transmitting linkage 102 may include a first arm 102A (see FIGS. 14*a* and 14*b*) and a second arm 102B (see FIGS. 14*a* and 14*b*). The first arm 102A may be connected to the lift motor 101. The second arm 102B may be rotatably connected to the first arm 102A, and rotatably connected below the lifting plate 103. One end of the first arm 102A may be connected to a rotation axis of the lift motor 101 and the other end thereof may be rotatably connected to the second arm 102B.

The second arm 102B may be curved such that a forward end of the second arm 102B is higher than a rearward arm thereof. One end of the second arm 102B may be rotatably connected to the first arm 102A and the other end thereof may be rotatably connected to an arm connector 103B (see FIGS. 14*a* and 14*b*) provided on the lifting plate 103. The arm connector 103B may be fastened to a rear or bottom face of the lifting plate 103.

Referring to FIGS. 14A and 14B, the lifting plate 103 may be lifted from a first position P1 to a second position P2 higher than the first position P1. A distance L1 between the lifting plate 103 and the fixing plate 104 when the lifting plate 103 is positioned in the first position P1 may be larger than a distance L2 between the lifting plate 103 and the fixing plate 104 when the lifting plate 103 is positioned in the second position P2. When the lifting plate 103 is in the first position P1, the first display 31 of the head 30 may be hidden in the casing 10 and the display 40 may be in contact with or adjacent to the outer face of the casing 10.

When the lifting plate 103 is in the second position P2, the first display 31 of the head 30 may protrude upwardly from the casing 10 and the display 40 may be spaced forwardly from the casing 10. When the lifting plate 103 is lifted from the first position P1 to the second position P2, the first display 31 and the second display 41 may be tilted upward, respectively.

When the lifting plate 103 is lifted, the head 30 may be moved upward and tilted upward, simultaneously, and the display 40 may be moved forward and tilted upward, simultaneously. Conversely, when the lifting plate 103 descends, the head 30 may be moved downward and tilted downward, simultaneously, and the display 40 may be moved backward and tilted downward, simultaneously.

Further, when the lifting plate 103 is lifted from the first position P1 to the second position P2, a variable amount of angle a1 in a facing direction of the first display 31 may be different from a variable amount of angle a2 in a facing direction of the second display 41. More specifically, when the lifting plate 130 is positioned in the first position P1, the first display 31 may be directed in a first direction D1, and the second display 41 may be directed in a second direction D2. When the lifting plate 130 is positioned in the second position P2, the first display 31 may be directed in a third direction D3, and the second display 41 may be directed in a fourth direction D4. The third direction D3 may be a direction tilted upward from the first direction D1, and the fourth direction D4 may be a direction tilted upward from the second direction D2. In this case, the angle a1 defined by the third direction D3 and the first direction D1 may be different from the angle a2 defined by the fourth direction D4 and the second direction D2.

Hereinafter, operations of the driving mechanism will be described. When the lift motor 101 rotates in one direction, the power transmitting linkage 102 may push the lifting plate 103 upward. The lifting plate 103 may be guided by the guide bar 106 and lifted.

The lifting plate 103 may be lifted and may push the contact bar 105 upward. The contact bar 105 may be guided by the first guide body 110 and may be moved upward. The bottom end of the contact bar 105 may be slid forward while maintaining contact with the top face of the lifting plate 103.

The guide bar 105 and the guide groove 105A defined in the contact bar 105 may be bent such that the head 30 connected to the top end of the contact bar 105 may be moved upward and may be tilted upward, simultaneously. Further, when the lifting plate 103 is lifted, the first connector 103A may also be lifted. Thus, an inclination of the first link bar 131 may become more gentle while rotating relative to the first connector 103A and the link connector 43. A length of the first link bar 131 in a back and forth direction may be increased. The second link bar 132 intersects the first link bar 131 and forms the joint 133. Therefore, an inclination of the second link bar 132 may become more gentle while rotating relative to the second connector 104A and the link connector 103. A length of the second link bar 132 in a back and forth direction may be increased.

The projection 134 of the second link bar 132 may move from a bottom end of the elongate hole 43A to a top end of the elongate hole 43A. Accordingly, the display 40 may be moved forward and tilted upward, simultaneously.

On the other hand, when the lift motor 101 rotates in the other direction, the power transmitting linkage 102 may pull the lifting plate 103 downward. The lifting plate 103 may be guided by the guide bar 106 and may descend.

When the lifting plate 103 descends, the contact bar 105 may be descended by load of the head 30 and self-load of the contact bar 105. The contact bar 105 may be guided by the first guide body 110 and may move downward. At this time, the bottom end of the contact bar 105 may be slid rearward while maintaining contact with the top face of the lifting plate 103.

The guide bar 105 and the guide groove 105A defined in the contact bar 105 may be bent such that the head 30 connected to the top end of the contact bar 105 moves downward and may be tilted downward, simultaneously.

Further, when the lifting plate 103 descends, the first connector 103A may also descend. Thus, the inclination of the first link bar 131 may become steeper while rotating relative to the first connector 103A and the link connector 43. The length of the first link bar 131 in the back and forth direction may be decreased. The second link bar 132 intersects the first link bar 131 and forms the joint 133. Therefore, the inclination of the second link bar 132 may become steeper while rotating relative to the second connector 104A and the link connector 103. The length of the second link bar 132 in the back and forth direction may be decreased.

The projection 134 of the second link bar 132 may move from the top end to the bottom end of the elongate hole 43A. Accordingly, the display 40 may be moved backward and tilted downward, simultaneously. Thus, using the single lift motor 101, not only may the head 30 and the display 40 be simultaneously tilted upwardly and downwardly, but also degrees to which the head 30 and the display 40 are tilted may be different from each other.

Figure 15A:
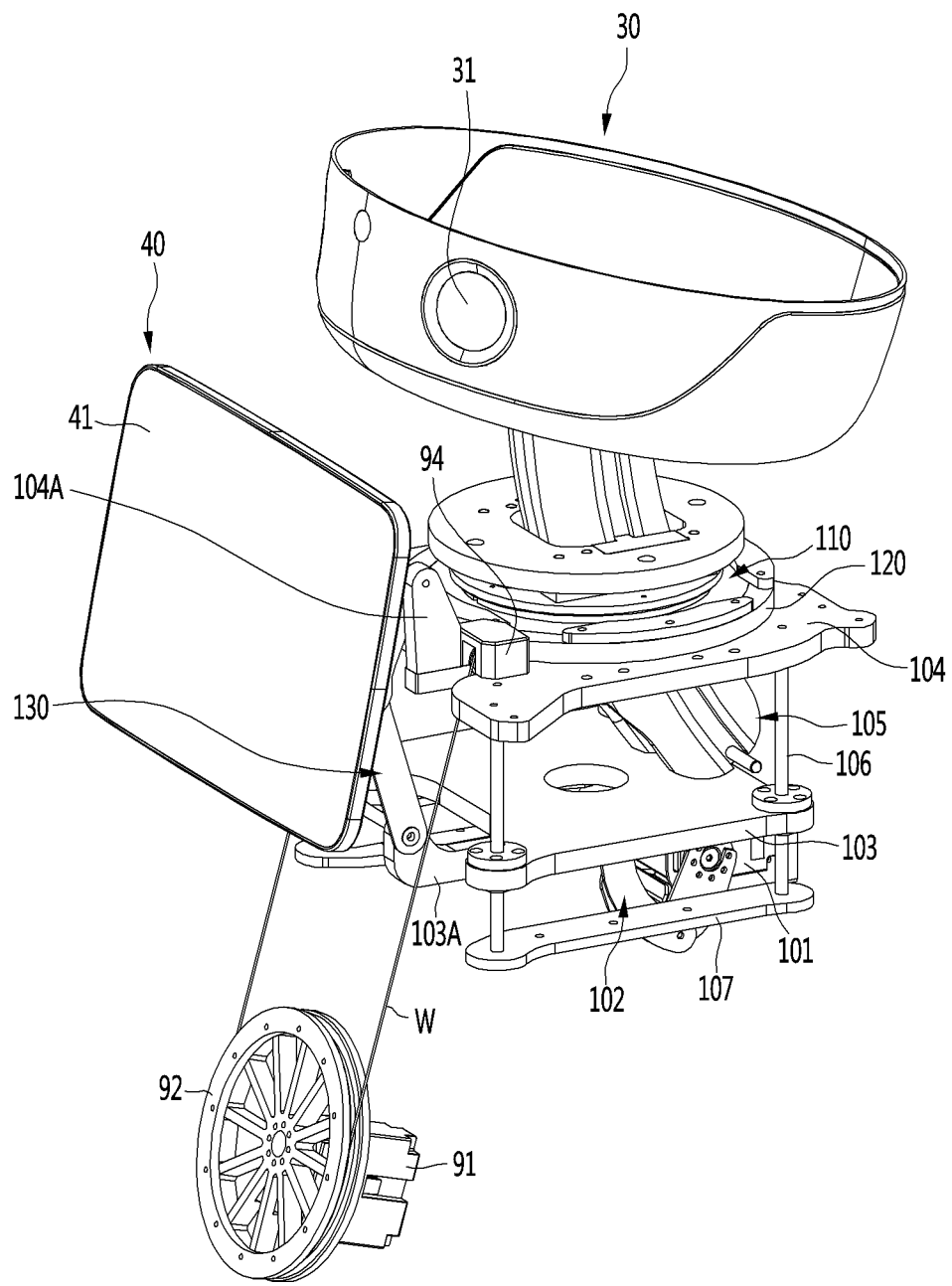
FIGS. 15A and 15B illustrate a rotation process of a head unit according to the embodiment of the present disclosure.
Figure 15B:
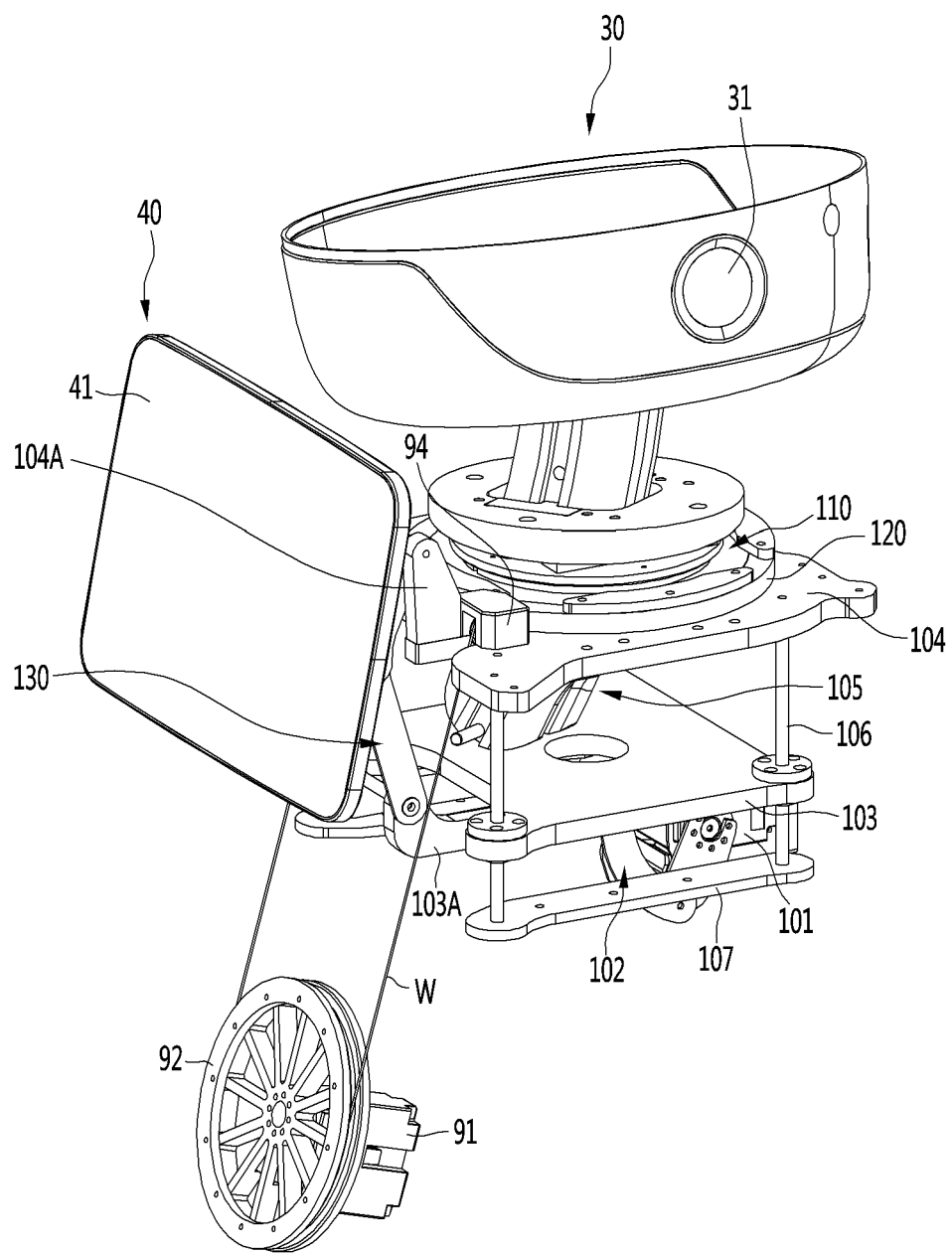
Figure 16:
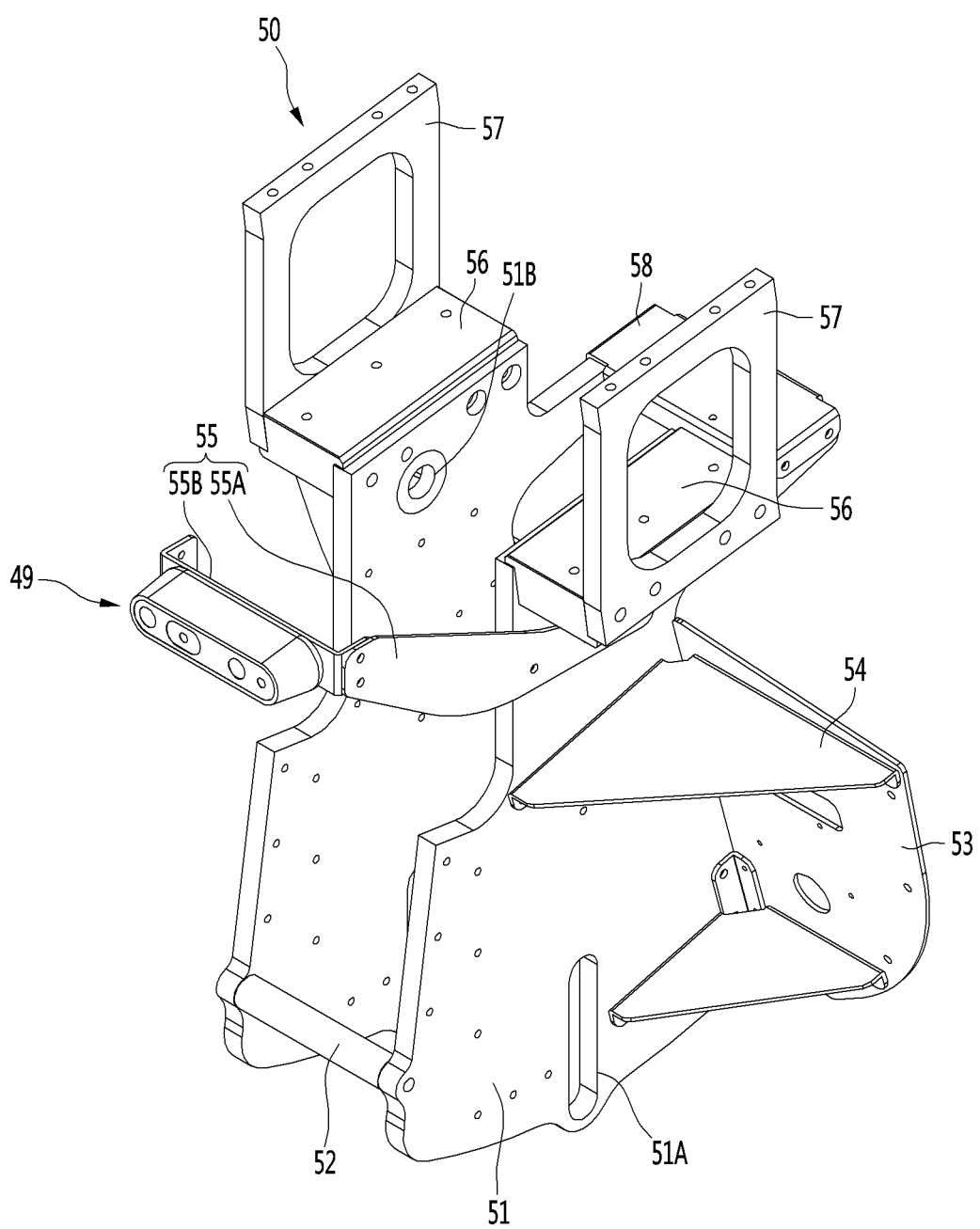
FIG. 16 is a perspective view of an inner frame according to an embodiment of the present disclosure.
Figure 17:
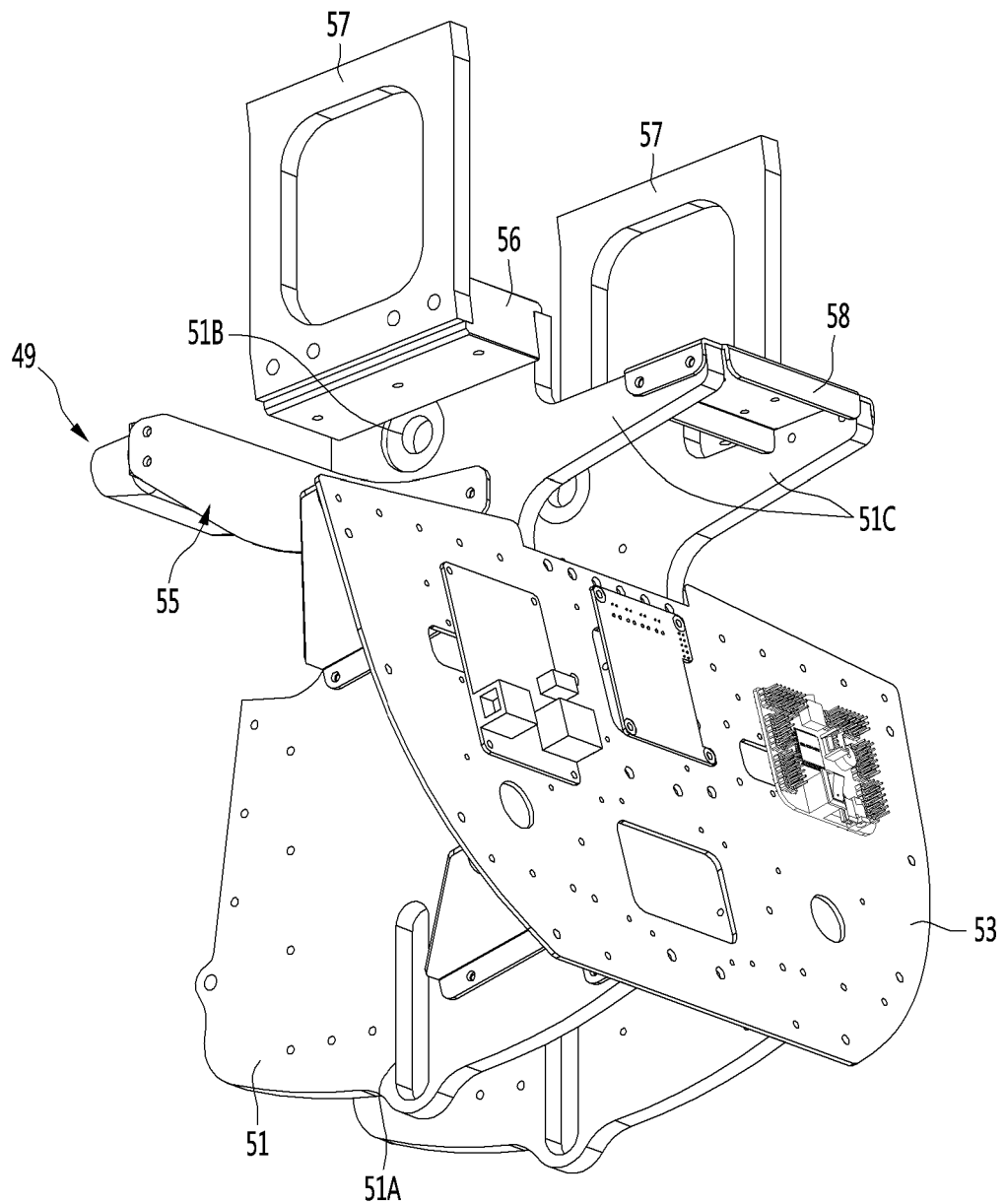
FIG. 17 illustrates the inner frame illustrated in FIG. 16 in another direction.
Figure 18:
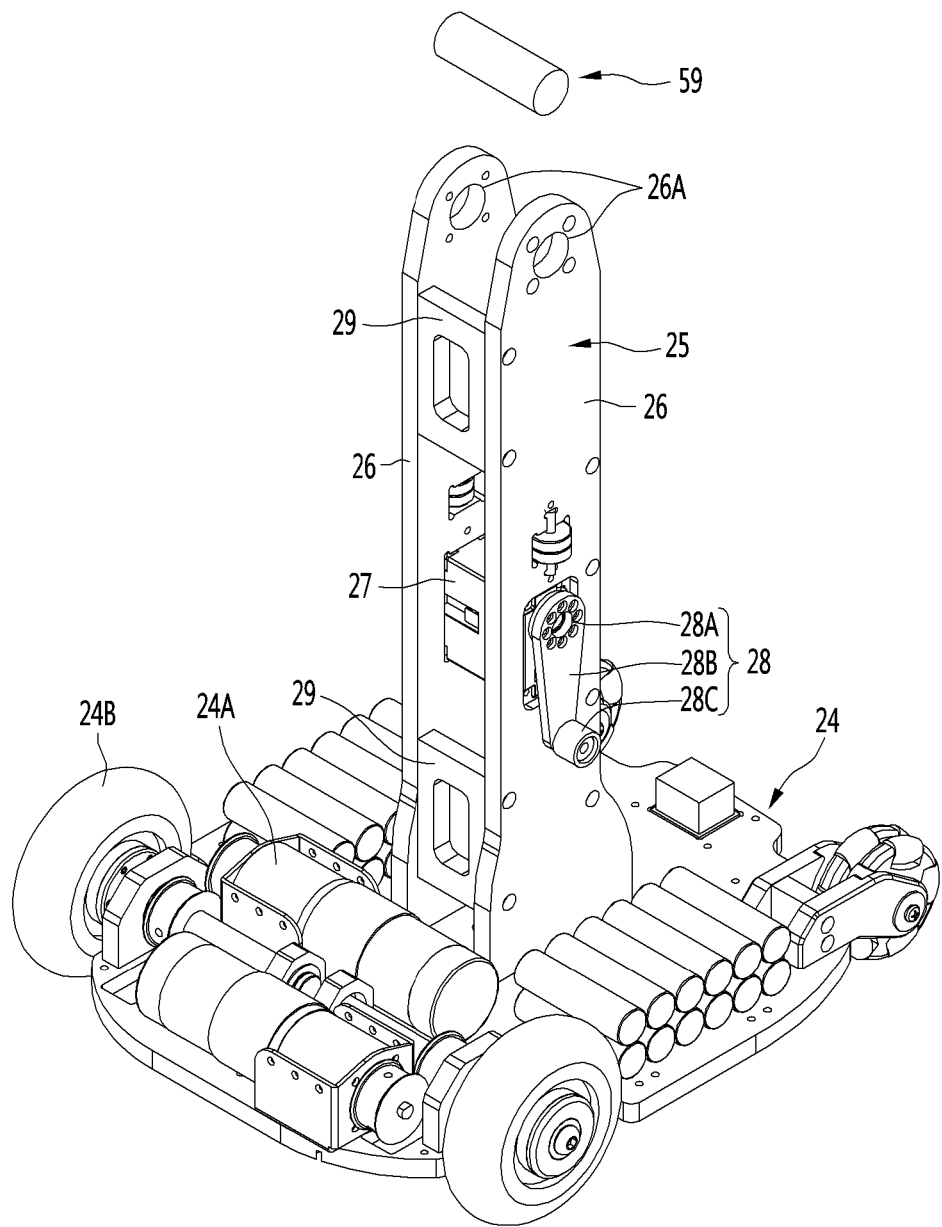
FIG. 18 illustrates a base plate and a column according to an embodiment of the present disclosure.
Figure 19:
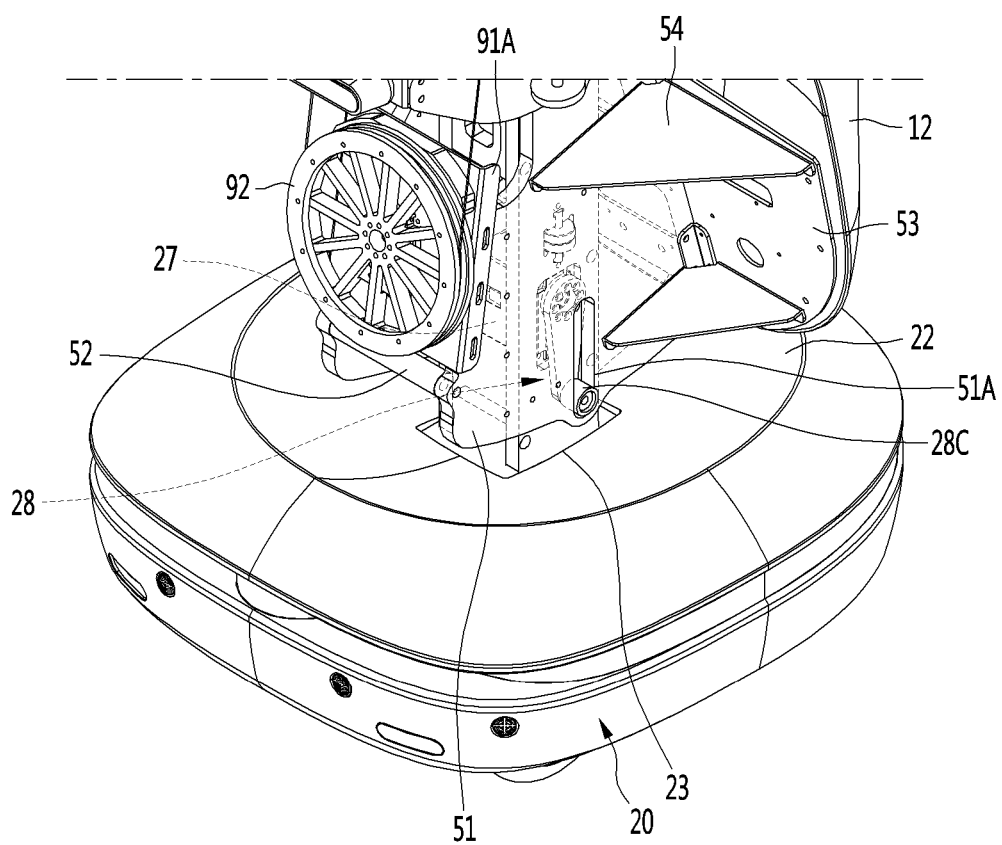
FIG. 19 illustrates a process in which a casing according to an embodiment of the present disclosure is tilted relative to a base.

Hereinafter, operations of the rotating mechanism will be described with reference to FIGS. 15A and 15B. When the rotating motor 91 rotates the rotating wheel 92 in one direction, the wire W may transmit the rotational force of the rotating wheel 92 to the first guide body 110, and the first guide body 110 may rotate in a first direction simultaneously with the rotating wheel 92. The first guide body 110 may be guided by the second guide body 120 and rotated.

The wire W may be supported by the wire supporting wheel 93 inside the wheel supporter 94 and may be held taut. Therefore, the rotational force of the rotating wheel 92 may be smoothly transmitted to the first guide body 110. The contact bar 105 may rotate with the first guide body 110. The bottom end of the contact bar 105 may be slid while maintaining contact with the top face of the lifting plate 103. The contact bar 105 may be bent. Therefore, the head 30 connected to the top end of the contact bar 105 may maintain a tilted state and may rotate in the first direction.

When the rotating motor 91 rotates the rotating wheel 92 in the other direction, the wire W may transmit the rotational force of the rotating wheel 92 to the first guide body 110, and the first guide body 110 may rotate in a second direction simultaneously with the rotating wheel 92. The contact bar 105 may rotate with the first guide body 110. The bottom end of the contact bar 105 may be slid while maintaining contact with the top face of the lifting plate 103. The contact bar 105 may be bent. Therefore, the head 30 connected to the top end of the contact bar 105 may rotate in the second direction while maintaining a tilted state.

Thus, the rotating motor 91 may rotate only the head 30 and may not rotate the display 40. In addition, the rotating motor 91 may rotate the head 31 irrespective of the degree of tilting of the head 30. Further, the bottom end of the contact bar 105 may be rotated while maintaining a state of being in contact with the top face of the lifting plate 103. Therefore, the head 30 may rotate while maintaining the tilted state.

Further, the rotating wheel 92 and the first guide body 110 may be connected by the wire W. Therefore, the virtual rotation axis X1 (see FIG. 10) of the rotating wheel 92 and the virtual rotation axis X2 of the first guide body 110 may not be aligned with each other. Therefore, a space in the casing 10 may be efficiently utilized. Thus, the robot may become compact.

Referring to FIGS. 16-19, the sensor device bracket 55 to which the sensor 49 is attached may be fastened to the inner frame 50. The sensor device bracket 55 may be fastened to at least one of the pair of main panels 51. The sensor device bracket 55 may include a connecting arm 55A connected to the inner frame 50 and a fastening part or arm 55B connected to the connecting arm 55A and on which the sensor device 49 is attached.

The connecting arm 55A may be elongated in a back and forth direction. The connecting arm 55A may separate the fastening arm 55B and the sensor 49 from the inner frame 50. The fastening arm 55B may be orthogonal to the connecting arm 55A. The sensor 49 may be fastened to a front face of the fastening arm 55B.

The column 25 may include at least one inner connector 29 for connecting the pair of column panels 26 to each other. The inner connector 29 may be positioned between the pair of column panels 26. Thereby, a structure of the column 25 may become more rigid.

At least a portion of the column 25 may be positioned within the inner frame 50. More specifically, the column 25 may be positioned between the pair of main panels 51 in the left and right direction, and positioned between the connecting bar 52 and the rear panel 53 in the back and forth direction. Further, the column 25 may be positioned between the rotating motor bracket 91A and the rear panel 53 in the back and forth direction.

The inner frame 50 may have a through-hole 51B defined therein through which the tilting shaft 59 is inserted. More specifically, the through-hole 51B may pass through upper portions of respective main panels 51 in a left and right direction. The tilting shaft 59 may pass through the through-hole 51B defined in the inner frame 50 and the tilting shaft receiving hole 26A defined in the column 25. Thereby, the inner frame 50 may be tilted back and forth relative to the column 25.

The inner frame 50 may be positioned above the depression 22 of the base 20. The inner frame 50 may be spaced above the depression 22. A guide elongate hole 51A may be defined in the inner frame 50. The guide elongate hole 51A may include a pair of guide elongated holes defined in at least one of the pair of main panels 51. The guide elongate hole 51A may be defined through a lower portion of each of the main panel 51 to pass through in a left and right direction. The guide elongate hole 51A may extend in a up and down direction.

A lever 28 may be connected to the tilting motor 27. The lever 28 may transmit the rotational force of the tilting motor 27 to the inner frame 50 to tilt the inner frame 50. The lever 28 may have a predetermined radius of rotation, therefore, an output required of the tilting motor 27 to tilt the inner frame may be relatively reduced.

The lever 28 may include a motor connecting part (or first hub) 28A, a lever body 28B, and a protrusion (or second hub) 28C. The motor connecting part 28A may be connected to the tilting motor 27. The lever body 28B may extend in a direction perpendicular to the rotation axis of the tilting motor 27 from the motor connecting part 28A. The rotation axis of the tilting motor 27 may extend in a horizontal direction, and the lever body 28B may be formed to extend in a vertical direction.

The protrusion 28C may protrude from the lever body 28B in a direction parallel to the rotation axis of the tilting motor 27. The protrusion 28C may be movably inserted into the guide elongate hole 51A defined in the inner frame 50.

Hereinafter, operations of the tilting motor 27 will be described. When the tilting motor 27 rotates the lever 28 in a first direction while the casing 10 is not tilted relative to the base 20, the protrusion 28C of the lever 28 may move from a bottom end of the guide elongate hole 51A to a top end of the elongate hole, and the inner frame 50 may be tilted forward about the tilting shaft 59.

The inner frame 50 may be connected to the casing 10 such that the casing 10 and the head 30 and the display 40 mounted thereto may be tilted forward together with the inner frame 50. When the tilting motor 27 rotates the lever 28 in a second direction while the casing 10 is not tilted relative to the base 20, the protrusion 28C of the lever 28 may move from the bottom end of the guide elongate hole 51A to the top end of the elongate hole, and the inner frame 50 may be tilted rearward about the tilting shaft 59. Thus, the casing 10 and the head 30 and the display 40 mounted thereto may be tilted rearward together with the inner frame.

In a robot according to an embodiment of the present disclosure, a contact bar connected to a head unit and a link to a display unit may be connected to an ascending and descending plate. Therefore, the head unit and the display unit may be tilted at the same time due to ascending and descending of the ascending and descending plate. Further, a first guide body that guides ascending and descending of the contact bar rotates such that the display unit does not rotate but only the head unit may rotate.

More specifically, a robot according to an embodiment of the present disclosure may include a casing having an internal space defined therein, a head unit protruding upwardly from the casing, and having a first display, a display unit disposed in front of the casing, and having a second display, an ascending and descending motor embedded in the casing, an ascending and descending plate ascending and descending via power of the ascending and descending motor, a contact bar having a top end thereof connected to the head unit and a bottom end thereof being maintained in a contact with the ascending and descending plate, a fixing plate positioned between the ascending and descending plate and the head unit, and having an opening defined therein through which the contact bar passes, a link for connecting the ascending and descending plate and the fixing plate to the display unit, a first guide body rotatably disposed above the fixing plate, and guiding movement of the contact bar, and a rotating motor rotating the first guide body.

The robot may further include a second guide body fixed onto a top face of the fixing plate, and surrounding at least a portion of outer circumference of the first guide body. The robot may further include a deviation preventing part coupled to a top face of the second guide body to prevent the first guide body from being deviated upwardly.

The robot may further include a head receiving cover fastened to a top face of the first guide body, and having a through-hole defined therein through which the contact bar passes. Further, the head receiving cover receives at least a portion of the head unit. An elongated guide groove may be defined in the contact bar and extend in a length direction of the contact bar. In addition, the first guide body may have a guide rib inserted into the guide groove.

The robot may further include a rotating wheel connected to the rotating motor, and a wire for transmitting rotational force of the rotating wheel to the first guide body. A virtual rotation axis of the rotating wheel may be tilted to be closer to a horizontal line than to a vertical line. In addition, a virtual rotation axis of the first guide body may be tilted to be closer to a vertical line than to a horizontal line.

The robot may further include a wire supporting wheel contacting the wire, and a wheel supporter disposed on the fixing plate, and rotatably supporting the wire support wheel. An interference-avoiding groove through which the wire passes may be defined in the fixing plate.

A lower portion of the wire supporting wheel may be partially located in the interference-avoiding groove. A through-hole through which the contact bar passes may be defined in the first guide body. In addition, a diameter of the through-hole may be smaller than a diameter of the opening.

An inner circumference of the opening may be spaced apart from the contact bar. The ascending and descending plate may be oriented to be tilted.

The robot of claim may further include a base disposed on a bottom face of the casing, a supporting column projecting upwardly from the base into the casing, an inner frame tiltably fastened to the supporting column, and a tilting motor for tilting the inner frame relative to the supporting column. Further, the casing and the inner frame together may be tilted relative to the base. A tilting axis of the inner frame may be separated from and positioned above the tilting motor.

The robot may further include a lever for transmitting rotational force of the tilting motor to the inner frame. The lever may include a motor connecting part connected to a rotation axis of the tilting motor, a lever body extending from the motor connecting part in a direction perpendicular to the rotation axis of the tilting motor, and a frame connecting part protruding from the lever body in a direction parallel to the rotation axis of the tilting motor and movably inserted into an elongate hole defined in the inner frame.

A depression may be defined downwardly in a top face of the base. In addition, the casing may be positioned in the depression. The fixing plate may be connected to and supported by the inner frame.

The rotating motor may be connected to and supported by the inner frame. A vertical dimension between the base and the ascending and descending motor may be larger than a vertical dimension between the base and the rotating motor.

The head unit and the display unit may be tilted, and the head unit may be rotated at the same time. Thereby, the robot may realize a natural operation so as to be similar to a human operation.

Further, the contact bar may slide while being in contact with the ascending and descending plate such that the contact bar and the head may be easily rotated. Further, the first guide body may also rotate the contact bar and the head unit simultaneously while guiding the ascending and descending of the contact bar. This allows the head unit to rotate regardless of a degree of tilting of the head unit.

Further, the second guide body may surround at least a portion of the outer circumference of the first guide body. Thereby, rotation of the first guide body may be guided by the second guide body. Further, the first guide body may be prevented from being deviated upwardly by the deviation preventing part coupled to the top face of the second guide body.

In addition, the head receiving cover may prevent foreign matter or the like from entering between the head unit and the casing. Further, the head receiving cover may be fastened to the first guide body and rotate with the contact bar. This allows the rotation of the head unit to be unobstructed by the head receiving cover.

Further, the first guide body may have the guide rib inserted into the guide groove defined in the contact bar. This allows the first guide body to easily guide the ascending and descending of the contact bar. Further, power of the rotating motor may be transmitted to the first guide body via the rotating wheel and the wire. Thereby, a rotation axis direction of the rotating wheel and a rotation axis direction of the first guide body may not be parallel to each other. Therefore, the space in the casing may be utilized more efficiently and the robot may become compact.

In addition, the wire may be supported by the wire supporting wheel to be held taut and may be bent. Thus, the rotational force of the rotating wheel may be smoothly transmitted to the first guide body. Further, the wire supporting wheel is rotatably supported by the wheel supporter. Thus, the wire supporting wheel may rotate without slipping against the wire. Thereby, power transmission efficiency of the wire may be increased.

Further, an interference-avoiding groove may be defined in the fixing plate. This may prevent the wire from interfering with the fixing plate. Further, a diameter of the through-hole defined in the first guide body may be smaller than a diameter of the opening defined in the fixing plate. This allows the contact bar to rotate smoothly without interfering with the fixing plate.

Further, the ascending and descending plate may be oriented to be tilted. This allows rotation axis directions of the first guide body and the head unit to be offset and the rotation operation of the head unit to become natural. Further, the inner frame and the casing may be tilted back and forth relative to the base. Thereby, various operations based on the traveling of the robot may be realized.

Further, the tilting motor may be spaced below the tilting shaft. Thus, even though an external impact or the like is transmitted to the tilting shaft, an impact transmitted to the tilting motor may be relatively small. Further, the lever connected to the tilting motor may tilt the inner frame. This may reduce an output required of the tilting motor.

Further, the depression may be defined in the top face of the base. This allows the casing to be tilted back and forth smoothly without interfering with the base. Further, the fixing plate may be connected to and supported by the inner frame. This allows the robot's tilting mechanism and rotating mechanism to be supported inside the casing.

Further, the vertical dimension between the base and the ascending and descending motor may be larger than the vertical dimension between the base and the rotating motor. Thereby, the internal space of the casing may be utilized efficiently such that the robot may become compact.

Hereinabove, although the present disclosure has been described with reference to exemplary embodiments, the present disclosure is not limited thereto, but may be variously modified and altered by those skilled in the art to which the present disclosure pertains without departing from the spirit and scope of the present disclosure.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a casing;
a head configured to protrude upward from or retract into the casing and having a first display;
a second display provided on a front of the casing;
a first motor provided in the casing;
a lifting plate configured to ascend and descend via a power input from the first motor;
a first bar having a first end connected to the head and a second end that abuts the lifting plate;
a fixed plate positioned between the lifting plate and the head and having an opening through which the first bar passes;
a linkage that connects both the lifting plate and the fixed plate to the second display;
a first guide body rotatably provided above the fixed plate and configured to guide the first bar; and
a second motor that rotates the first guide body.

2. The robot of claim 1, further comprising a second guide body fixed to a top face of the fixed plate, wherein the second guide body surrounds at least a portion of an outer circumference of the first guide body.

3. The robot of claim 2, further comprising at least one alignment plate coupled to a top face of the second guide body and configured to prevent the first guide body from further upward movement.

4. The robot of claim 1, further comprising a head receiving cover coupled to a top face of the first guide body, and having a through-hole through which the first bar passes, wherein the head receiving cover is configured to accommodate at least a portion of the head when the robot is in a first position.

5. The robot of claim 1, wherein the first bar comprises a guide groove provided on an outer surface of the first bar and extending from a first end to a second end of the first bar, and
wherein the first guide body includes a guide rib configured to be inserted into the guide groove.

6. The robot of claim 1, further comprising:
a rotating wheel connected to the second motor; and
a wire operably connected to the rotating wheel and the first guide body and configured to transmit a rotational force from the rotating wheel to the first guide body.

7. The robot of claim 6, wherein a rotation axis of the rotating wheel extends in a first direction, and
wherein a rotation axis of the first guide body extends in a second direction, the second direction being different from the first direction.

8. The robot of claim 6, further comprising:
a pulley that supports the wire; and
a pulley housing provided on the fixed plate and configured to rotatably support the pulley.

9. The robot of claim 8, wherein the fixed plate comprises at least one wire groove through which the wire passes.

10. The robot of claim 9, wherein a lower portion of the pulley is partially located in the wire groove.

11. The robot of claim 1, wherein the first guide body comprises a through-hole through which the first bar passes, and wherein a diameter of the through-hole of the first guide body is smaller than a diameter of the opening of the fixed plate.

12. The robot of claim 1, wherein an inner circumference of the opening is larger than a rotation circumference of the first bar when the first guide body is rotated.

13. The robot of claim 1, wherein the lifting plate is tilted to an angle greater than zero with respect to a horizontal axis.

14. The robot of claim 1, further comprising:
a base provided under the casing;
a frame column that projects upward from the base into the casing;
an inner frame coupled to the frame column and configured to be tilted with respect to the frame column; and
a third motor configured to provide a rotational force to tilt the inner frame relative to the frame column,
wherein the casing and the inner frame are collectively tilted relative to the base.

15. The robot of claim 14, wherein an axis about which the inner frame tilts is separated from and positioned above the third motor.

16. The robot of claim 14, further comprising a lever configured to transmit the rotational force of the third motor to the inner frame,
wherein the lever includes:
a first hub connected to the third motor;
a lever body extending from the first hub in a direction perpendicular to the rotation axis of the third motor; and
a second hub that protrudes from the lever body in a direction parallel to the rotation axis of the third motor, the second hub configured to be inserted into an elongate hole defined in the inner frame.

17. The robot of claim 14, wherein a depression is defined in a top face of the base, and wherein the casing is positioned in the depression.

18. The robot of claim 14, wherein the fixed plate is connected to and supported by the inner frame.

19. The robot of claim 14, wherein the second motor is connected to and supported by the inner frame.

20. The robot of claim 1, wherein a vertical distance between the base and the first motor is larger than a vertical distance between the base and the second motor.

* * * * *